United States Patent
Watanabe

(10) Patent No.: US 7,643,031 B2
(45) Date of Patent: Jan. 5, 2010

(54) IMAGE-PROCESSING DEVICE AND PROGRAM

(75) Inventor: Kenichi Watanabe, Aichi (JP)

(73) Assignee: Brother Kogyo Kabushiki Kaisha, Aichi (JP)

( * ) Notice: Subject to any disclaimer, the term of this patent is extended or adjusted under 35 U.S.C. 154(b) by 484 days.

(21) Appl. No.: 11/482,024

(22) Filed: Jul. 7, 2006

(65) Prior Publication Data

US 2007/0008320 A1 Jan. 11, 2007

(30) Foreign Application Priority Data

Jul. 8, 2005 (JP) ............................. 2005-200478

(51) Int. Cl.
*G06T 11/00* (2006.01)
(52) U.S. Cl. .................. 345/467; 345/468; 345/469; 345/470; 345/471; 345/472
(58) Field of Classification Search .......... 345/467–472
See application file for complete search history.

(56) References Cited

U.S. PATENT DOCUMENTS

| | | | | |
|---|---|---|---|---|
| 4,590,464 A | * | 5/1986 | Imaizumi et al. ............ | 345/172 |
| 4,851,825 A | * | 7/1989 | Naiman ...................... | 345/596 |
| 5,046,023 A | * | 9/1991 | Katsura et al. .............. | 345/619 |
| 5,081,594 A | * | 1/1992 | Horsley ...................... | 345/467 |
| 5,289,170 A | * | 2/1994 | Fujii ...................... | 345/469.1 |
| 5,293,472 A | * | 3/1994 | Lotspiech ................... | 345/443 |
| 5,754,187 A | * | 5/1998 | Ristow et al. ............... | 345/469 |
| 6,552,727 B2 | * | 4/2003 | Stamm ....................... | 345/467 |
| 6,563,502 B1 | * | 5/2003 | Dowling et al. .......... | 345/469.1 |
| 6,714,322 B1 | * | 3/2004 | Minamino .................. | 358/3.06 |
| 6,760,028 B1 | * | 7/2004 | Salesin et al. ............... | 345/469 |
| 6,760,029 B1 | * | 7/2004 | Phinney et al. ............... | 345/471 |
| 6,762,770 B1 | * | 7/2004 | Opstad et al. ............... | 345/589 |
| 7,042,458 B2 | * | 5/2006 | Frisken et al. ............... | 345/469 |
| 7,068,276 B2 | * | 6/2006 | Salesin et al. ............... | 345/469 |
| 7,129,948 B2 | * | 10/2006 | Salesin et al. ............... | 345/469 |
| 7,262,774 B2 | * | 8/2007 | Iwata et al. .................. | 345/467 |
| 7,292,249 B2 | * | 11/2007 | Stamm et al. ............... | 345/468 |
| 7,307,632 B1 | * | 12/2007 | Garritsen .................... | 345/471 |

(Continued)

FOREIGN PATENT DOCUMENTS

JP 9-198499 7/1997

*Primary Examiner*—Ulka Chauhan
*Assistant Examiner*—Michael Rooney
(74) *Attorney, Agent, or Firm*—McDermott Will & Emery LLP

(57) ABSTRACT

An information-processing device (such as an image-processing device) executes a boldface character generating process when it is judged that a character should be expressed in boldface type based on a drawing instruction inputted from outside and there exists no boldface form data of the character corresponding to font information comprised in the drawing instruction. In the boldface character-generating process, the information-processing device generates pattern data lacking at least one dot at each of the four corners and generates the boldface form data by enlarging the drawing area of bitmap data (generated from standard form data) based on the pattern data. The at least one missing dot at each of the four corners of the pattern data, allows edges of the generated boldface character to be expressed finely even when the boldface character is generated from a character having an oblique element (oblique line, curved line, etc.).

20 Claims, 13 Drawing Sheets

U.S. PATENT DOCUMENTS

| | | | |
|---|---|---|---|
| 7,333,110 B2* | 2/2008 | Arnold et al. | 345/467 |
| 7,342,585 B2* | 3/2008 | Matskewich et al. | 345/472 |
| 7,379,075 B2* | 5/2008 | Opstad et al. | 345/601 |
| 2002/0093502 A1* | 7/2002 | Koyama | 345/467 |
| 2004/0160444 A1* | 8/2004 | Salesin et al. | 345/471 |
| 2005/0264571 A1* | 12/2005 | Stamm et al. | 345/469 |

* cited by examiner

IMAGE-PROCESSING DEVICE AND PROGRAM

CROSS-REFERENCE TO RELATED APPLICATION

This application claims priority under 35 U.S.C. §119 from Japanese Patent Application No. 2005-200478, filed on Jul. 8, 2005. The entire subject matter of the application is incorporated herein by reference.

FIELD

The present invention relates to an image-processing device and an image-processing method for generating boldface characters (characters in boldface type) from standard characters (characters in standard type).

BACKGROUND

Image-processing devices capable of generating bitmap data of a boldface character (a character in boldface type) by use of bitmap data expressing a standard character (the character in standard type) are widely known and used today. Such an image-processing device is generally designed to generate the boldface bitmap data by enlarging the drawing area of the standard bitmap data.

For example, an image-processing device disclosed in Japanese Patent Provisional Publication No. HE109-198499 generates a boldface character from a standard character (standard bitmap data) by successively shifting the whole drawing area of the standard bitmap data rightward (for example) dot by dot to a prescribed shift amount while converting (incorporating) each shifted area into the drawing area and thereafter successively shifting the enlarged drawing area (including the above shifted areas) downward (for example) dot by dot to a prescribed shift amount while converting (incorporating) each shifted area into the drawing area.

However, when a boldface character is generated by such an image-processing device, the movement area (enlarged area) regarding each dot in the drawing area of the standard bitmap data forms a square or rectangular shape, by which edges of the generated boldface character can be expressed unnaturally especially when the boldface character is generated from a character having an oblique element (such as the character "J" in Gothic font and italic characters) even though ideal result can be obtained when the boldface character is generated from a character made of horizontal and vertical elements only (such as the character "H" in Gothic font).

SUMMARY

The present invention which has been made in consideration of the above problem is advantageous in that an image-processing device and an image-processing program, capable of generating boldface characters that are expressed finely even when the boldface characters are generated from characters having oblique elements, can be provided.

BRIEF DESCRIPTION OF THE ACCOMPANYING DRAWINGS

DETAILED DESCRIPTION

General Overview

Figure 1:
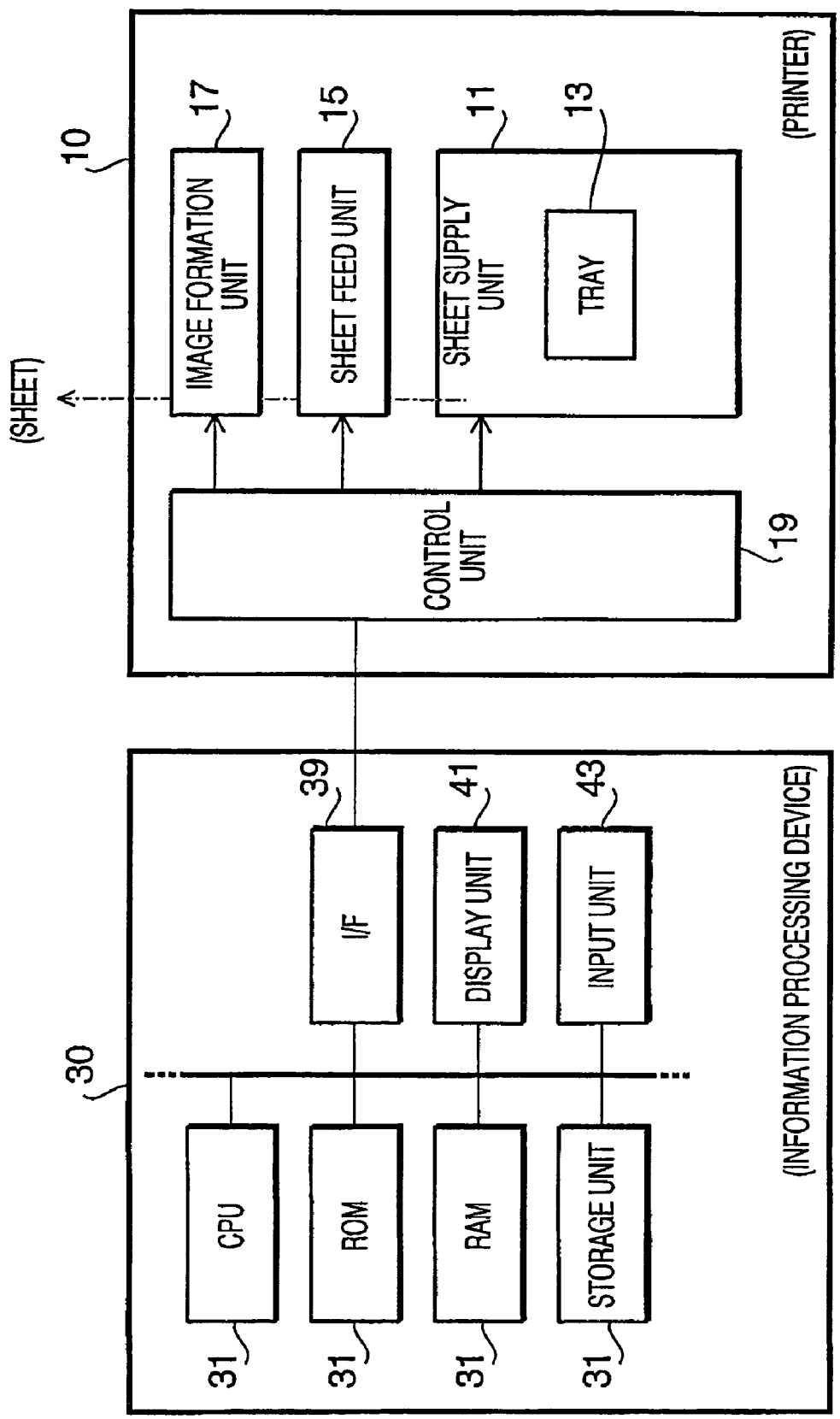
FIG. 1 is a block diagram showing the composition of an image-formation system in accordance with a first embodiment of the present invention.

It is noted that various connections are set forth between elements in the following description. It is noted that these connections in general and unless specified otherwise, may be direct or indirect and that this specification is not intended to be limiting in this respect. Aspects of the invention may be implemented in computer software as programs storable on computer-readable media including but not limited to RAMs, ROMs, flash memory, EEPROMs, CD-media, DVD-media, temporary storage, hard disk drives, floppy drives, permanent storage, and the like.

In accordance with an aspect of the present invention, there is provided an image-processing device comprising: a storage unit which stores font data of each character (including a character code specifying the character and form data representing form of the character specified by the character code) with the form data including at least standard form data in each of prescribed fonts; a judgment unit which judges whether each character should be expressed in boldface type or not based on style information comprised in a drawing instruction in response to reception of the drawing instruction which comprises a character code specifying a character, font information specifying a font type, font size information specifying a font size, and the style information at least specifying whether or not to express the character in boldface type; a boldface data generating unit which generates boldface form data of the character in response to the judgment unit judging that the character should be expressed in boldface type, by reading out the standard form data of the character corresponding to the font type specified by the font information comprised in the drawing instruction from the storage unit, determining shift amounts in horizontal and vertical directions based on the font size information comprised in the drawing instruction, and repeating drawing of the standard form data while shifting the standard form data in the horizontal and vertical directions according to the determined shift amounts; and an output unit which converts form data such as the boldface form data generated by the boldface data generating unit into image-formation data and outputs the image-formation data to an image-formation device which forms an image according to the image-formation data. The boldface data generating unit includes a shift amount adjustment unit which adjusts the shift amounts in the horizontal and vertical directions so that result of the repetition of the drawing of each dot of the standard form data while shifting the standard form data in the horizontal and vertical directions according to the shift amounts will lack one or more dots at each of four corners. The boldface data generating unit generates the boldface form data by repeating the drawing of the standard form data according to the shift amounts in the horizontal and vertical directions adjusted by the shift amount adjustment unit.

In the image-processing device configured as above, when it is judged that a character should be expressed in boldface type based on the style information included in the received drawing instruction, the boldface form data of the character is generated by determining the shift amounts for the standard form data in the horizontal and vertical directions based on the font size information included in the drawing instruction and repeating the drawing of the standard form data while shifting the standard form data in the horizontal and vertical directions according to the determined shift amounts. The generated boldface form data is converted into image-formation data and outputted to an image-formation device.

Especially in the generation of the boldface form data, the shift amounts in the horizontal and vertical directions are adjusted so that the result of the repetition of the drawing of each dot of the standard form data while shifting the standard form data in the horizontal and vertical directions according to the shift amounts will lack one or more dots at each of the four corners, and the boldface form data is generated from the standard form data based on the adjusted shift amounts.

With the image-processing device configured as above, the shift amounts for the standard form data in the horizontal and vertical directions are adjusted so that the result of the repetition of the drawing of each dot of the standard form data will lack one or more dots at each of the four corners, by which satisfactory results can be obtained even when a standard character having an oblique element is converted into a boldface character.

Preferably, the shift amount adjustment unit adjusts the shift amounts in a plurality of adjustment patterns differing in the positions and number of the missing one or more dots at each of the four corners in the result of the repetition of the drawing of each dot of the standard form data. The shift amount adjustment unit makes the adjustment of the shift amounts by selecting an adjustment pattern corresponding to the font type specified by the font information from the plurality of adjustment patterns.

With the above configuration, the adjustment of the shift amounts can be made by selecting a suitable pattern from the adjustment patterns depending on the font of the character, by which more satisfactory results can be obtained.

Preferably, the shift amount adjustment unit comprises a plurality of mathematical expressions corresponding to the plurality of adjustment patterns respectively. The shift amount adjustment unit determines the shift amounts of each adjustment pattern using a mathematical expression corresponding to each adjustment pattern.

With the above configuration, the process for generating the boldface form data can be executed at high speed since the process is only required to calculate each shift amount by use of one of the mathematical expressions.

In accordance with another aspect of the present invention, there is provided an image-processing device comprising: a storage unit which stores font data of each character (comprising a character code specifying the character and form data representing form of the character specified by the character code) with the form data including at least standard form data in each of prescribed fonts; a judgment unit which judges whether each character should be expressed in boldface type or not based on style information comprised in a drawing instruction in response to receipt of the drawing instruction comprising a character code specifying a character, font information specifying a font type, and the style information at least specifying whether or not to express the character in boldface type; a boldface data generating unit which reads out the standard form data of the character corresponding to the font type specified by the font information comprised in the drawing instruction from the storage unit and generates boldface form data of the character from the standard form data in response to the judgment unit judging that the character should be expressed in boldface type; and an output unit which converts form data such as the boldface form data generated by the boldface data-generating unit into image-formation data and outputs the image-formation data to an image-formation device which forms an image according to the image-formation data. The boldface data generating unit comprises a pattern data storage unit which stores pattern data made of a plurality of dots extending from a prescribed reference dot in a matrix lacking at least one dot at each of four corners. The boldface data generating unit generates the boldface form data by generating drawing data which expresses the character by drawn dots to be drawn and undrawn dots not to be drawn based on the standard form data read out from the storage unit, reading out the pattern data from the pattern data storage unit, and enlarging a drawing area of the drawing data based on the pattern data.

With the image-processing device configured as above, the boldface form data is generated from the standard form data by use of the pattern data lacking at least one dot at each of the four corners, by which satisfactory result can be obtained even when a standard character having an oblique element is converted into a boldface character.

Preferably, the boldface data generating unit generates the boldface form data by enlarging the drawing area of the drawing data, by successively placing the reference dot of the pattern data on each drawn dot of the drawing data and drawing all the dots inside a pattern area (formed each time by the dots of the pattern data) as drawn dots.

With the above configuration, the enlargement of the drawing area of the drawing data is made successively for each drawn dot of the drawing data, by which the process for generating the boldface form data can be carried out in a simple way.

Preferably, the pattern data storage unit stores multiple pieces of pattern data in different shapes. The boldface data generating unit reads out pattern data corresponding to the font type specified by the font information from the pattern data storage unit for the generation of the boldface form data.

With the above configuration, the pattern data read out from the pattern data storage unit for the generation of the boldface form data is changed depending on the font of the character, by which more satisfactory results can be obtained.

Preferably, the drawing instruction comprises font size information specifying a font size. The boldface data generating unit enlarges or reduces the pattern data read out from the pattern data storage unit based on the font size specified by the font size information for the generation of the boldface form data.

With the above configuration, the pattern data to be used for the generation of the boldface form data is enlarged or reduced based on the font size information, by which more satisfactory result can be obtained. Further, the pattern data storage unit can be implemented with smaller storage capacity since the pattern data storage unit is not required to store the pattern data for every character size.

Preferably, the drawing instruction can comprise italic type information specifying that the character should be expressed in italic type, and the judgment unit further judges whether or not the italic type information is comprised in the drawing instruction. In response to the judgment unit judging that the italic type information is comprised in the drawing instruction and the character should be expressed in boldface type, the boldface data generating unit generates the drawing data for italic type by deforming the standard form data based on a prescribed lean angle of italic type, reads out the pattern data from the pattern data storage unit, generates pattern data for italic type by deforming dot arrangement of the pattern data read out from the pattern data storage unit around the reference dot based on the lean angle, and generates the boldface form data by use of the drawing data for italic type and the pattern data for italic type.

With the above configuration, the present invention can be applied also to cases where italic boldface characters are generated from (italic) standard characters. Since italic characters generally include oblique elements, the aforementioned effects can be obtained similarly for the italic boldface characters.

Preferably, the drawing instruction can comprise rotation information specifying rotation of the character, and the judgment unit further judges whether or not the rotation information is comprised in the drawing instruction. In response to the judgment unit judging that the rotation information is comprised in the drawing instruction and the character should be expressed in boldface type, the boldface data generating unit generates the drawing data for rotation by rotating the standard form data based on an angle specified by the rotation information, reads out the pattern data from the pattern data storage unit, generates pattern data for rotation by rotating dot arrangement of the pattern data read out from the pattern data storage unit around the reference dot by a rotation angle corresponding to the rotation information, and generates the boldface form data by use of the drawing data for rotation and the pattern data for rotation.

With the above configuration, the present invention can be applied also to cases where rotated boldface characters are generated from (rotated) standard characters. Since rotated characters generally include oblique elements, the aforementioned effects can be obtained similarly for the rotated boldface characters.

In accordance with another aspect of the present invention, there is provided an image-processing device comprising: a storage unit which stores font data of each character (including a character code specifying the character and form data representing form of the character specified by the character code) with the form data comprising at least standard form data in each of prescribed fonts; a judgment unit which judges whether each character should be expressed in boldface type or not based on style information comprised in a drawing instruction in response to reception of the drawing instruction comprising a character code specifying a character, font information specifying a font type, font size information specifying a font size, and the style information at least specifying whether or not to express the character in boldface type; a boldface data generating unit which generates boldface form data of the character in response to the judgment unit judging that the character should be expressed in boldface type, by reading out the standard form data of the character corresponding to the font type specified by the font information comprised in the drawing instruction from the storage unit, determining shift amounts in horizontal and vertical directions based on the font size information included in the drawing instruction, and repeating drawing of the standard form data while shifting the standard form data in the horizontal and vertical directions according to the determined shift amounts; and an output unit which converts form data such as the boldface form data generated by the boldface data generating unit into image-formation data and outputs the image-formation data to an image-formation device which forms an image according to the image-formation data. The drawing instruction can comprise italic type information specifying that the character should be expressed in italic type, and the judgment unit further judges whether or not the italic type information is comprised in the drawing instruction. The boldface data generating unit comprises a shift amount adjustment unit which adjusts the shift amounts in the horizontal and vertical directions based on the font size information and the italic type information. In response to the judgment unit judging that the italic type information is comprised in the drawing instruction and the character should be expressed in boldface type, the boldface data generating unit generates the boldface form data by generating form data for italic type by deforming the standard form data based on a prescribed lean angle of italic type and repeating drawing of the form data for italic type according to the shift amounts determined by the shift amount adjustment unit.

With the image-processing device configured as above, when the italic boldface form data is generated from the standard form data, the shift amounts are adjusted based on the font size information and the italic type information, and the italic boldface form data is generated by repeating the drawing of the form data for italic type (generated by deforming the standard form data based on the prescribed lean angle of italic type) according to the adjusted shift amounts.

Therefore, oblique parts in the generated boldface character can be expressed finely even when italic boldface form data is generated.

Preferably, the shift amount adjustment unit determines the shift amounts by use of a mathematical expression which has been prepared corresponding to the italic type information.

With the above configuration, the process for generating the italic boldface form data can be executed at high speed since the process is only required to calculate each shift amount by use of the mathematical expression corresponding to the italic type information.

In accordance with another aspect of the present invention, there is provided an image-processing device comprising: a storage unit which stores font data of each character (including a character code specifying the character and form data representing form of the character specified by the character code) with the form data comprising at least standard form data in each of prescribed fonts; a judgment unit which judges whether each character should be expressed in boldface type or not based on style information comprised in a drawing instruction in response to reception of the drawing instruction comprising a character code specifying a character, font information specifying a font type, font size information specifying a font size, and the style information at least specifying whether or not to express the character in boldface type; a boldface data generating unit which generates boldface form data of the character in response to the judgment unit judging that the character should be expressed in boldface type, by reading out the standard form data of the character corresponding to the font type specified by the font information comprised in the drawing instruction from the storage unit, determining shift amounts in horizontal and vertical directions based on the font size information comprised in the drawing instruction, and repeating drawing of the standard form data while shifting the standard form data in the horizontal and vertical directions according to the determined shift amounts; and an output unit which converts form data such as the boldface form data generated by the boldface data generating unit into image-formation data and outputs the image-formation data to an image-formation device which forms an image according to the image-formation data. The drawing instruction can comprise rotation information specifying rotation of the character, and the judgment unit further judges whether or not the rotation information is comprised in the drawing instruction. The boldface data generating unit includes a shift amount adjustment unit which adjusts the shift amounts in the horizontal and vertical directions based on the font size information and the rotation information. In response to the judgment unit judging that the rotation information is comprised in the drawing instruction and the character should be expressed in boldface type, the boldface data generating unit generates the boldface form data by generating form data for rotation by rotating the standard form data based on an angle specified by the rotation information and repeating drawing of the form data for rotation according to the shift amounts determined by the shift amount adjustment unit.

With the image-processing device configured as above, when the rotation information is included in the drawing instruction, the shift amounts in the horizontal and vertical directions are adjusted based on the font size information and the rotation information (specifying a rotation angle), by which oblique parts in the generated boldface character can be expressed finely even when boldface form data of a rotated character is generated.

Preferably, the shift amount adjustment unit determines the shift amounts by use of a mathematical expression which has been prepared corresponding to the rotation information.

With the above configuration, the process for generating the rotated boldface form data can be executed at high speed since the process is only required to calculate each shift amount by use of the mathematical expression corresponding to the rotation information.

In accordance with another aspect of the present invention, there is provided an image-processing device comprising: a storage unit which stores font data of each character (including a character code specifying the character and form data representing form of the character specified by the character code) with the form data comprising at least standard form data in each of prescribed fonts; a judgment unit which judges whether each character should be expressed in boldface type or not based on style information comprised in a drawing instruction in response to reception of the drawing instruction comprising a character code specifying a character, font information specifying a font type, and the style information at least specifying whether or not to express the character in boldface type; a boldface data generating unit which reads out the standard form data of the character corresponding to the font type specified by the font information comprised in the drawing instruction from the storage unit and generates boldface form data of the character from the standard form data in response to the judgment unit judging that the character should be expressed in boldface type; and an output unit which converts form data such as the boldface form data generated by the boldface data generating unit into image-formation data and outputs the image-formation data to an image-formation device which forms an image according to the image-formation data. The drawing instruction can comprise italic type information specifying that the character should be expressed in italic type, and the judgment unit further judges whether or not the italic type information is comprised in the drawing instruction. The boldface data generating unit comprises a pattern data storage unit which stores pattern data for italic type made of a plurality of dots extending from a prescribed reference dot in a matrix and generated based on a prescribed lean angle of italic type. In response to the judgment unit judging that the italic type information is comprised in the drawing instruction and the character should be expressed in boldface type, the boldface data generating unit generates the boldface form data by deforming the standard form data read out from the storage unit based on the prescribed lean angle of italic type, generating drawing data for italic type (which expresses the character in italic type by drawn dots to be drawn and undrawn dots not to be drawn) based on the deformed standard form data, reading out the pattern data for italic type from the pattern data storage unit, and enlarging a drawing area of the drawing data for italic type based on the pattern data for italic type.

With the image-processing device configured as above, the boldface form data is generated from the standard form data by use of the pattern data for italic type generated based on the prescribed lean angle of italic type, by which oblique parts in the generated boldface character can be expressed finely even when an italic character is converted into a boldface character.

Preferably, the boldface data generating unit generates the boldface form data by enlarging the drawing area of the drawing data, by successively placing the reference dot of the pattern data on each drawn dot of the drawing data and drawing all the dots inside a pattern area (formed each time by the dots of the pattern data) as drawn dots.

With the above configuration, the enlargement of the drawing area of the drawing data is made successively for each drawn dot of the drawing data, by which the process for generating the boldface form data can be carried out in a simple way.

According to another aspect of the invention, there is provided a computer readable medium comprising computer-readable instructions that cause a computer to judge whether each character should be expressed in boldface type or not based on style information comprised in a drawing instruction in response to reception of the drawing instruction comprising a character code specifying a character, font information specifying a font type, font size information specifying a font size, and the style information at least specifying whether or not to express the character in boldface type, to generate boldface form data of the character if it is judged that the character should be expressed in boldface type, by reading out standard form data of the character corresponding to the font type specified by the font information comprised in the drawing instruction from a storage unit which stores font data of each character including a character code specifying the character and form data representing form of the character specified by the character code with the form data including at least standard form data in each of prescribed fonts, determining shift amounts in horizontal and vertical directions based on the font size information comprised in the drawing instruction, and repeating drawing of the standard form data while shifting the standard form data in the horizontal and vertical directions according to the determined shift amounts, and to convert form data such as the boldface form data into image-formation data so as to output the image-formation data to an image-formation device which forms an image according to the image-formation data.

In generating the boldface data, the shift amounts in the horizontal and vertical directions are adjusted so that result of the repetition of the drawing of each dot of the standard form data while shifting the standard form data in the horizontal and vertical directions according to the shift amounts will lack one or more dots at each of four corners, and the boldface form data is generated by repeating the drawing of the standard form data according to the adjusted shift amounts in the horizontal and vertical directions.

According to another aspect of the invention, there is provided a computer readable medium comprising computer-readable instructions that cause a computer to judge whether each character should be expressed in boldface type or not based on style information comprised in a drawing instruction in response to receipt of the drawing instruction comprising a character code specifying a character, font information specifying a font type, and the style information at least specifying whether or not to express the character in boldface type, to read out standard form data of the character corresponding to the font type specified by the font information comprised in the drawing instruction from a storage unit, in which font data of each character comprising a character code specifying the character and form data representing form of the character specified by the character code are stored with the form data comprising at least standard form data in each of prescribed fonts, wherein generating boldface form data of the character from the standard form data in response to the judgment step judging that the character should be expressed in boldface type, and to convert form data such as the boldface form data into image-formation data so as to output the image-formation data to an image-formation device which forms an image according to the image-formation data.

In generating the boldface data, the boldface form data is generated by generating drawing data which expresses the character by drawn dots to be drawn and undrawn dots not to be drawn based on the standard form data read out from the storage unit, reading out pattern data comprising a plurality of dots extending from a prescribed reference dot in a matrix lacking at least one dot at each of four corners from a pattern data storage unit, and enlarging a drawing area of the drawing data based on the pattern data.

According to another aspect of the invention, there is provided a computer readable medium comprising computer-readable instructions that cause a computer to judge whether each character should be expressed in boldface type or not based on style information comprised in a drawing instruction in response to receipt of the drawing instruction comprising a character code specifying a character, font information specifying a font type, font size information specifying a font size, and the style information at least specifying whether or not to express the character in boldface type, to generate boldface form data of the character if it is judged that the character should be expressed in boldface type, by reading out standard form data of the character corresponding to the font type specified by the font information comprised in the drawing instruction from a storage unit which stores font data of each character including a character code specifying the character and form data representing form of the character specified by the character code with the form data including at least standard form data in each of prescribed fonts, determining shift amounts in horizontal and vertical directions based on the font size information comprised in the drawing instruction, and repeating drawing of the standard form data while shifting the standard form data in the horizontal and vertical directions according to the determined shift amounts, and to convert form data such as the boldface form data into image-formation data so as to output the image-formation data to an image-formation device which forms an image according to the image-formation data.

In this configuration, the drawing instruction can comprise italic type information specifying that the character should be expressed in italic type, and whether or not the italic type information is comprised in the drawing instruction is further judged. In generating the boldface data, the shift amounts in the horizontal and vertical directions are adjusted based on the font size information and the italic type information. If it is judged that the italic type information is comprised in the drawing instruction and the character should be expressed in boldface type, the boldface form data is generated by generating form data for italic type by deforming the standard form data based on a prescribed lean angle of italic type and repeating drawing of the form data for italic type according to the shift amounts.

According to another aspect of the invention, there is provided a computer readable medium comprising computer-readable instructions that cause a computer to judge whether each character should be expressed in boldface type or not based on style information comprised in a drawing instruction in response to receipt of the drawing instruction comprising a character code specifying a character, font information specifying a font type, font size information specifying a font size, and the style information at least specifying whether or not to express the character in boldface type, to generate boldface form data of the character if it is judged that the character should be expressed in boldface type, by reading out standard form data of the character corresponding to the font type specified by the font information comprised in the drawing instruction from a storage unit which stores font data of each character including a character code specifying the character and form data representing form of the character specified by the character code with the form data including at least standard form data in each of prescribed fonts, determining shift amounts in horizontal and vertical directions based on the font size information comprised in the drawing instruction, and repeating drawing of the standard form data while shifting the standard form data in the horizontal and vertical directions according to the determined shift amounts, and to convert form data such as the boldface form data into image-formation data so as to output the image-formation data to an image-formation device which forms an image according to the image-formation data.

In this configuration, the drawing instruction can comprise rotation information specifying rotation of the character, and whether or not the rotation information is comprised in the drawing instruction is further judged. In generating the boldface data, the shift amounts in the horizontal and vertical directions are adjusted based on the font size information and the rotation information. If it is judged that the rotation information is comprised in the drawing instruction and the character should be expressed in boldface type, the boldface form data is generated by generating form data for rotation by rotating the standard form data based on an angle specified by the rotation information and repeating drawing of the form data for rotation according to the shift amounts.

According to another aspect of the invention, there is provided a computer readable medium comprising computer-readable instructions that cause a computer to judge whether each character should be expressed in boldface type or not based on style information comprised in a drawing instruction in response to receipt of the drawing instruction comprising a character code specifying a character, font information specifying a font type, and the style information at least specifying whether or not to express the character in boldface type, to read out standard form data of the character corresponding to the font type specified by the font information comprised in the drawing instruction from a storage unit, in which font data of each character comprising a character code specifying the character and form data representing form of the character specified by the character code are stored with the form data comprising at least standard form data in each of prescribed fonts, so as to generate boldface form data of the character from the standard form data if it is judged that the character should be expressed in boldface type, and to convert form data such as the boldface form data into image-formation data so as to output the image-formation data to an image-formation device which forms an image according to the image-formation data.

In this configuration, the drawing instruction can comprise italic type information specifying that the character should be expressed in italic type, and whether or not the italic type information is comprised in the drawing instruction is further judged. If it is judged that the italic type information is comprised in the drawing instruction and the character should be expressed in boldface type, the boldface form data is generated by deforming the standard form data read out from the storage unit based on a prescribed lean angle of italic type, generating drawing data for italic type which expresses the character in italic type by drawn dots to be drawn and undrawn dots not to be drawn based on the deformed standard form data, reading out pattern data for italic type comprising a plurality of dots extending from a prescribed reference dot in a matrix and generated based on the prescribed lean angle of italic type from a pattern data storage unit, and enlarging a drawing area of the drawing data for italic type based on the pattern data for italic type.

Illustrative Embodiments

Referring now to the drawings, a description will be given in detail of preferred embodiments in accordance with the present invention.

First Embodiment

FIG. 1 is a block diagram showing the composition of an image-formation system in accordance with a first embodiment of the present invention.

As shown in FIG. 1, the image-formation system of the first embodiment includes a printer 10 and an information processing device 30 which is connected to the printer 10 to communicate data with the printer 10.

The printer 10, as a printer of a well-known type (inkjet printer, laser printer, etc.), includes a sheet supply unit 11, a sheet feed unit 15, an image-formation unit 17, and a control unit 19. The control unit 19 has centralized control of the sheet supply unit 11, the sheet feed unit 15 and the image-formation unit 17.

The sheet supply unit 11 includes a sheet supply tray 13 in which rectangular cut sheets of A4 size, for example, are stacked up. The sheet supply unit 11 pulls out the uppermost sheet from the stack of sheets in the sheet supply tray 13 in a prescribed direction and thereby supplies each sheet to the sheet feed unit 15.

The sheet feed unit 15 feeds the sheet supplied from the sheet supply unit 11 to an image-formation position in the image-formation unit 17. The image-formation unit 17 under the control of the control unit 19 forms an image on the sheet at the image-formation position according to image-formation data supplied from the information processing device 30.

Incidentally, when the printer 10 is an inkjet printer, the image-formation unit 17 scans an unshown print head (having ink nozzles for discharging ink, arranged substantially in the sheet feed direction) in a "line direction" orthogonal to the sheet feed direction while discharging ink from the ink nozzles onto the sheet at the image-formation position according to the image-formation data, by which a line of image is formed on the sheet at the image-formation position on each scan of the print head. By repeating the print head scan while feeding the sheet in the sheet feed direction, a whole image is formed on the sheet. When the printer 10 is a laser printer, the image-formation unit 17 transfers a toner image (previously formed on an image bearing body such as an image bearing drum) to the sheet passing through the image-formation position (as a contact point (line) between the image-bearing body and a transfer body such as a transfer roller), by which an image is formed on the sheet.

As above, the image is successively formed on the sheet, starting from the front end of the sheet in the sheet feed direction. After the whole image is formed on the sheet, the printed sheet is ejected to an unshown output tray.

The control unit 19, for controlling the components of the printer 10 as above, is connected with the information processing device 30 to communicate data. The control unit 19 controls the image-formation unit 17 according to the image-formation data supplied from the information processing device 30, by which an image is formed on each sheet supplied and fed from the sheet supply unit 11.

Meanwhile, the information processing device 30 includes a CPU (Central Processing Unit) 31 executing various processes, a ROM (Read Only Memory) 33 storing various programs, a RAM (Random Access Memory) 35 to be used as work areas during execution of the programs by the CPU 31, a storage unit (HDD (Hard Disk Drive)) 37 storing various applications and data, an interface 39 connecting the information processing device 30 with the printer 10 to enable data communication, a display unit 41 having a display (e.g. LCD (Liquid Crystal Display)) for displaying a variety of information, and an input unit 43 having a keyboard, a pointing device, etc.

In the storage unit 37, font data, including a character code (representing a character) and form data (representing the form of the character specified by the character code), is stored in regard to each of prescribed fonts.

Figure 2:
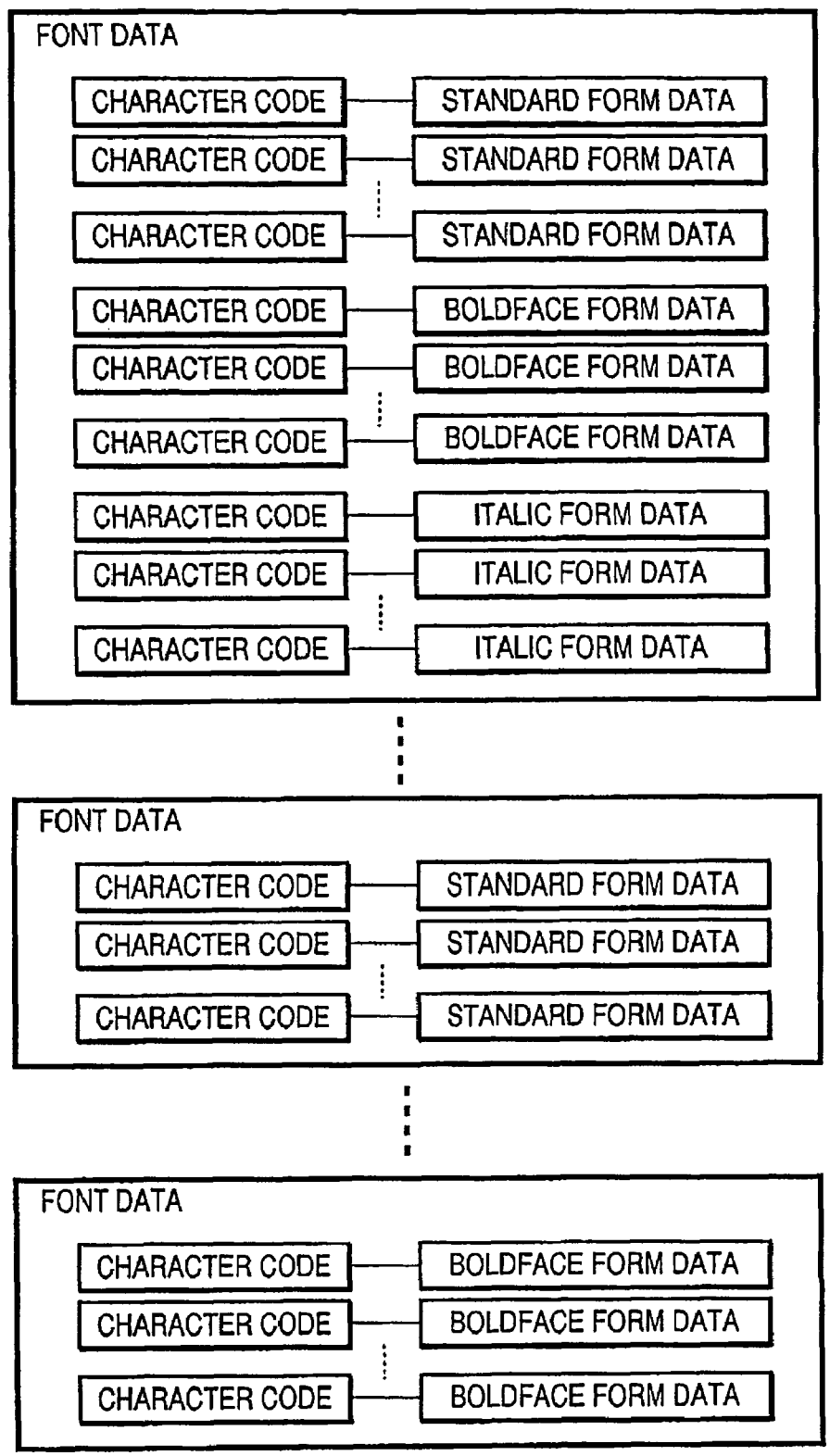
FIG. 2 is an explanatory drawing showing the composition of font data.

FIG. 2 is an explanatory drawing showing the composition of font data. As shown in FIG. 2, the font data can be classified into two types: font data including standard form data (form data in standard type), boldface form data (form data in boldface type) and italic form data (form data in italic type); and font data including standard form data only.

When a drawing instruction for requesting the printer 10 to form a character as an image is inputted to the information processing device 30 through the input unit 43, the information processing device 30 (CPU 31) executes a character formation process of generating image-formation data (which can be processed by the printer 10) based on the drawing instruction and outputting the generated image-formation data to the printer 10.

Especially when no boldface form data is included in the font data of a character stored in the storage unit 37 when the character has to be expressed in boldface type in the character formation process, a boldface character generating process (explained later herein) is executed by the CPU 31 using the standard form data included in the font data of the character specified to be expressed in boldface type. In the boldface character-generating process, the boldface form data is generated from the standard form data by use of at least a piece of data selected from five pieces of reference pattern data 50a-50e (shown in FIGS. 3A-3E) having different shapes.

After generating the image-formation data, the information processing device 30 outputs the generated image-formation data to the printer 10 via the interface 39.

Next, the reference pattern data 50a-50e which are used in the boldface character-generating process will be explained below referring to FIGS. 3A-3E. The reference pattern data 50a-50e are prestored in the storage unit 37. Incidentally, the reference pattern data 50a-50e are prepared and stored in the storage unit 37 in pattern sizes that are suitable for the conversion from the standard form data into the boldface form data in the same character size.

Figures 3A, 3B, 3C, 3D, 3E:
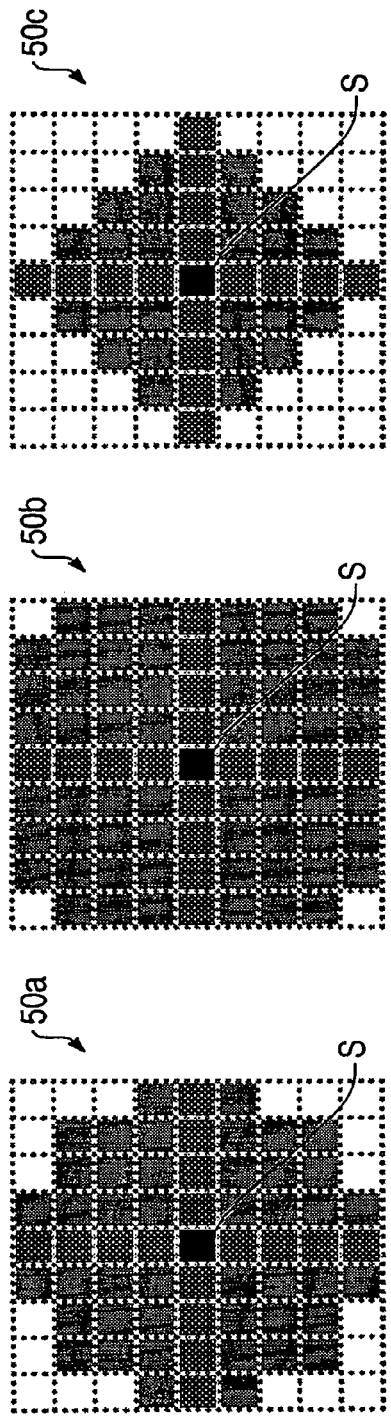
FIGS. 3A-3E are schematic diagrams showing reference pattern data which are used in a boldface character generating process.

As shown in FIGS. 3A-3C, each of the reference pattern data 50a-50c has a matrix-like dot pattern extending in the four directions (upward, downward, rightward and leftward) from a "reference dot S" at the center (shown as a black dot in FIGS. 3A-3C), in which at least one dot is cut away from each of the four corners (of the square made of 9×9 dots).

Specifically, the reference pattern data 50a shown in FIG. 3A has a substantially circular (round) dot pattern around the reference dot S. Meanwhile, the reference pattern data 50b shown in FIG. 3B has a dot pattern substantially in a square shape, lacking one dot at each of the four corners. The reference pattern data 50c shown in FIG. 3C has a dot pattern substantially in the diamond shape extending around the reference dot S.

The reference pattern data 50d shown in FIG. 3D has a leaned dot pattern which is formed by deforming (leaning) a rectangular matrix-like dot pattern around the reference dot S by a prescribed angle. An angle around 70 degrees is generally used as the prescribed angle.

The reference pattern data 50e shown in FIG. 3E has a dot pattern which is originally a matrix-like dot pattern in a square shape around the reference dot S. When the reference pattern data 50e is used, the square dot pattern is rotated around the reference dot S by a proper angle.

Incidentally, FIG. 3E is showing a state in which the reference pattern data 50e for rotation has been rotated around the reference dot S by 45 degrees. In the following explanation, the reference pattern data 50d (FIG. 3D) and the reference pattern data 50e (FIG. 3E) will be referred to as an "italic reference pattern data 50d" and a "rotational reference pattern data 50e", respectively.

Next, the character formation process executed by the information processing device 30 will be explained below referring to a flow chart of FIG. 4. The character formation process is executed by the CPU 31 of the information processing device 30 when the drawing instruction is inputted through the input unit 43.

At the start of the character formation process, the CPU 31 determines whether to express a character in boldface type or not based on the inputted drawing instruction (S110). Specifically, the drawing instruction includes a character code representing a character, font information representing a font, size information representing a character size, and style information specifying whether or not to express the character in boldface type. In the step S110, the CPU 31 determines whether to express the character in boldface type or not based on the style information included in the drawing instruction. Depending on the case, the drawing instruction can further include italic type information specifying that the character should be expressed in italic type and/or rotation information specifying rotation of the character by a certain angle.

When the CPU 31 determines to express the character in boldface type (S110: YES), the process advances to step S120. On the other hand, when the CPU 31 determines not to express the character in boldface type (S110: NO), the process advances to step S130.

In the step S120, the CPU 31 extracts font data corresponding to the character code and font information included in the inputted drawing instruction from the storage unit 37 and checks whether or not boldface form data exists in the extracted font data.

If boldface form data exists in the font data (S120: YES), the process advances to the step S130. On the other hand, if no boldface form data exists in the font data (S120: NO), the process advances to step S140.

In the step S130, the CPU 31 executes an image-formation data conversion process of reading out form data corresponding to the drawing instruction from the storage unit 37 and converting the form data into image-formation data. After the image-formation data conversion process (S130) is finished, the process advances to step S160. In the image-formation data conversion process (S130), the form data of the character read out from the storage unit 37 is converted into the image-formation data by enlarging/reducing the form data to a character size corresponding to the size information (included in the drawing instruction) and rotating the enlarged/reduced form data by a rotation angle corresponding to the rotation information (when the rotation information is included in the drawing instruction).

In the step S140, the CPU 31 executes the aforementioned boldface character generating process, in which standard form data included in the font data corresponding to the drawing instruction (character code, font information) is read out from the storage unit 37 and boldface form data is generated by enlarging the drawing area of the standard form data by use of at least a piece of data selected from the reference pattern data 50a-50e shown in FIGS. 3A-3E. The boldface character generating process will be explained in detail later.

After finishing the boldface character generating process (S140), the CPU 31 converts the boldface form data generated in S140 into image-formation data (S150).

Figure 4:
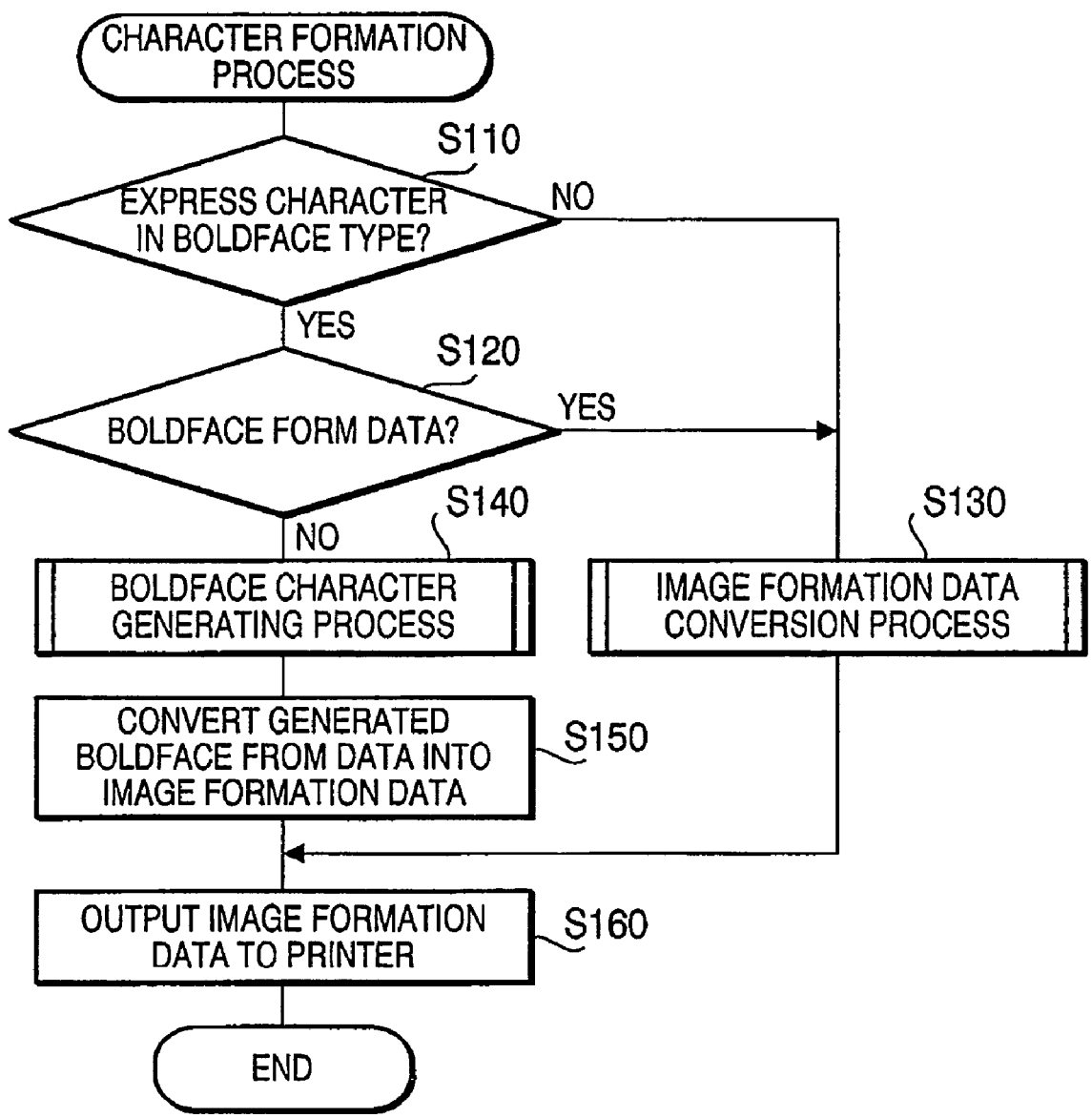
FIG. 4 is a flow chart showing a character formation process executed by a CPU of an information processing device included in the image-formation system of the first embodiment.

In the next step S160, the CPU 31 outputs the image-formation data obtained in the step S130 or S150 to the printer 10, by which the character-formation process of FIG. 4 is completed.

By the above process, the image-formation data is supplied from the information processing device 30 to the printer 10 and an image (character) according to the image-formation data is formed on a sheet by the printer 10.

Next, the boldface character-generating process which is executed by the CPU 31 in the step S140 of FIG. 4 will be explained in detail referring to a flow chart of FIG. 5.

At the start of the boldface character generating process, the CPU 31 determines an enlargement/reduction ratio for the reference pattern data 50a-50e (which corresponds to a "shift amount" indicating how long the standard form data should be shifted in order to generate the boldface form data) based on the size information included in the drawing instruction (S210).

For example, when the boldface character-generating process is carried out directly using the reference pattern data 50*b* shown in FIG. 3B (without changing its size), the boldface form data is generated (i.e. the standard form data is thickened) by shifting each dot of the standard form data in the four directions (upward, downward, rightward and leftward) by four dots (without using the aforementioned "one dot" at each of the four corners). However, when the character size specified by the size information is very large, the boldface form data generated by the method (four-dot shift in the four directions) can hardly be discriminated from the standard form data. In such cases, the "shift amount" has to be set larger than four dots in order to enable the discrimination between boldface type and standard type (between the boldface form data and the standard form data). From such a viewpoint, the shift amount is determined in terms of the enlargement/reduction ratio in the step S210 in this embodiment.

Subsequently, the CPU 31 checks whether or not the rotation information is included in the drawing instruction (S220). If the rotation information is included in the drawing instruction (S220: YES); the CPU 31 determines to rotate the character by the rotation angle according to the rotation information and advances to step S230. On the other hand, if no rotation information is included in the drawing instruction (S220: NO), the CPU 31 determines not to rotate the character and advances to step S240.

In the step S230, the CPU 31 reads out the rotational reference pattern data 50*e* from the storage unit 37 and rotates the rotational reference pattern data 50*e* around the reference dot S by the rotation angle according to the rotation information. Thereafter, the process advances to the step S240.

In the step S240, the CPU 31 checks whether or not the italic type information is included in the drawing instruction. If the italic type information is included in the drawing instruction (S240: YES), the CPU 31 determines to express the character in italic type and advances to step S250. On the other hand, if no italic type information is included in the drawing instruction (S240: NO), the CPU 31 determines not to express the character in italic type and advances to step S260.

In the step S250, the CPU 31 reads out the italic reference pattern data 50*d* from the storage unit 37. Thereafter, the process advances to the step S260. In the step S260, the CPU 31 reads out the reference pattern data 50*a*, 50*b* or 50*c* to be used this time from the storage unit 37 based on the font information. In this embodiment, the reference pattern data 50*a* in the round shape is read out when the font specified by the font information is "Mincho" font (font widely used in Japan for drawing Japanese characters such as Kanji characters and Japanese syllabary characters), the reference pattern data 50*b* in the substantially square shape is read out when the font is Gothic font, and the reference pattern data 50*c* in the diamond shape is read out when the font is Century font.

In the next step S270, the CPU 31 generates pattern data to be used this time by enlarging/reducing the one or more pieces of reference pattern data read out from the storage unit 37 so far according to the ratio determined in the step S210 and using them together (when two or more pieces of reference pattern data have been read out).

In the next step S280, the CPU 31 reads out standard form data included in the font data corresponding to the drawing instruction (character code, font information) from the storage unit 37 and generates bitmap data (which expresses the character by "drawn dots" to be drawn and "undrawn dots" not to be drawn) based on the standard form data.

Incidentally, in the step S280, the CPU 31 executes the conversion from the standard form data (read out from the storage unit 37) into the bitmap data after enlarging/reducing the standard form data based on the size information. In the case where the rotation information is included in the drawing instruction (S220: YES), the CPU 31 generates the bitmap data by rotating the standard form data according to the rotation information. In the case where the italic type information is included in the drawing instruction (S240: YES), the CPU 31 generates the bitmap data by deforming (leaning) the standard form data by the prescribed angle.

Figure 5:
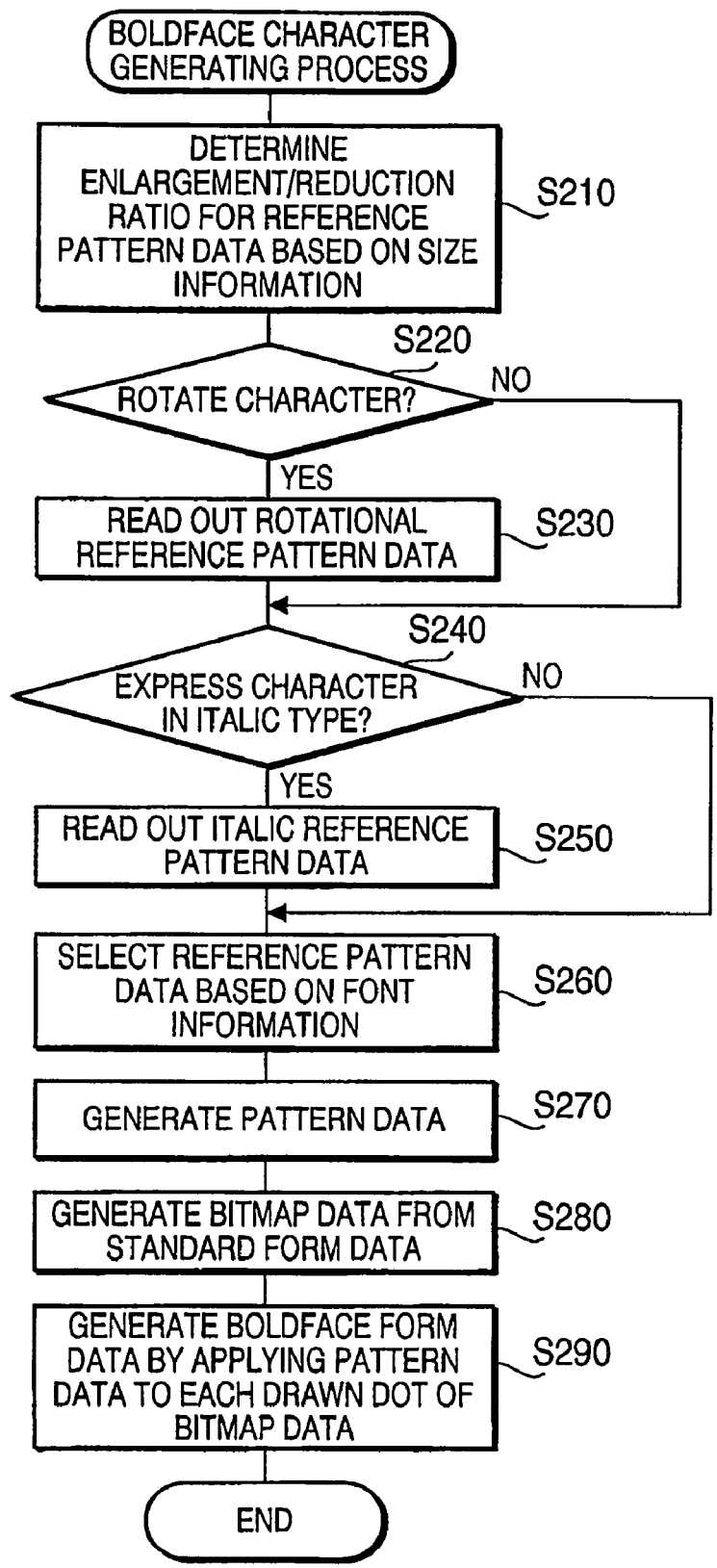
FIG. 5 is a flow chart showing a boldface character generating process executed by the CPU.

In the next step S290, the CPU 31 generates the boldface form data by enlarging the drawing area of the bitmap data generated in the step S280, by successively placing the reference dot S of the pattern data generated in S270 on each drawn dot of the bitmap data and drawing all the dots inside a "pattern area" (formed each time by the dots of the pattern data) as drawn dots, by which the boldface character generating process of FIG. 5 is completed.

In the following, examples of the boldface character generating process of FIG. 5, for generating boldface form data, italic boldface form data and rotated boldface form data from the standard form data, will be described in detail.

First, a case where boldface form data is generated from standard form data (of a Japanese syllabary character pronounced "shi" (which looks like "L") in this example) included in the font data of "Mincho" font will be explained referring to FIGS. 6A-6C.

At the start of the boldface character generating process, the CPU 31 of the information processing device 30 determines the enlargement/reduction ratio for the reference pattern data 50*a*-50*e* based on the size information included in the drawing instruction (S210). Afterward, the CPU 31 selects (reads out) the reference pattern data 50*a* in the round shape considering that the font of the character (the target of processing) is "Mincho" font (S260) and generates reduced and round pattern data shown in FIG. 6A according to the enlargement/reduction ratio determined in S210 (S270). Incidentally, the character as the target of processing is assumed to be smaller than a standard size in the example of FIG. 6A.

Figure 6C:
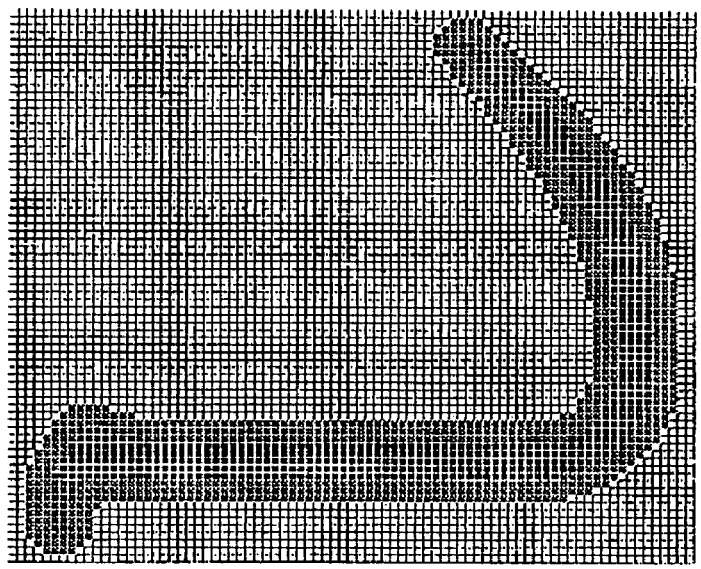
FIGS. 6A-6C are explanatory drawings showing an example of the boldface character generating process of the first embodiment for generating boldface form data from standard form data of a character in "Mincho" font.
Figure 6B:
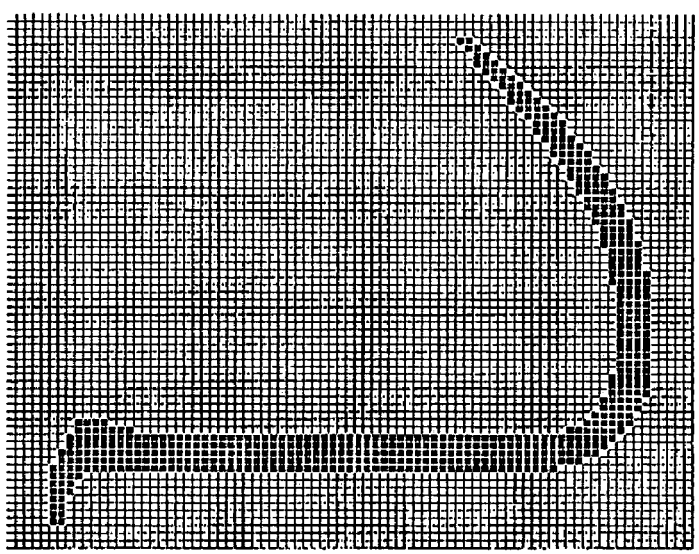

Subsequently, the CPU 31 generates bitmap data representing the Japanese character "shi" (i.e. the Japanese syllabary character pronounced "shi", ditto for the following explanation) in "Mincho" font from the standard form data as shown in FIG. 6B (S280). In this step, the bitmap data is generated while making size adjustment to let the bitmap data be in the size specified by the size information. Thereafter, the CPU 31 generates the boldface form data from the bitmap data by enlarging the drawing area of the bitmap data generated in S280 as shown in FIG. 6C, by successively placing the reference dot S of the round pattern data of FIG. 6A on each drawn dot of the bitmap data and drawing all the dots inside the "pattern area" (formed each time by the dots of the pattern data) as drawn dots (S290).

Figure 6A:
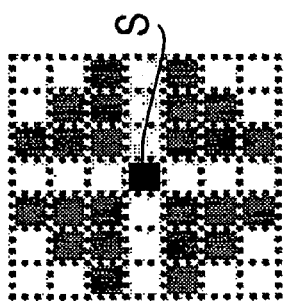

Here, the round pattern data (FIG. 6A) generated in the example of FIGS. 6A-6C includes the reference dot S, three dots arranged to extend from the reference dot S in each of the four directions (upward, downward, rightward and leftward), three dots on each side of each dot vertically adjoining the reference dot S, two dots on each side of each second dot vertically from the reference dot S, and one dot on each side of each third dot vertically from the reference dot S.

By enlarging the drawing area of the bitmap data by use of such pattern data, each corner part of the enlarged drawing area is smoothed in a round shape compared to that in the conventional method enlarging the drawing area in the four directions (upward, downward, rightward and leftward) by the same number of dots (resulting in a square enlarged area for each dot), by which edges of each character can be expressed finely even when a character (such as the Japanese character "shi" in "Mincho" font) having a curved part and an oblique element like the so-called "tail" (an oblique tapering part, which is characteristic of "Mincho" font) is converted into a boldface character. Especially, the thin part at the tip of the so-called "tail" (oblique tapering part) can also be expressed beautifully.

Next, a case where boldface form data is generated from standard form data (of the Japanese character "shi" in this example) included in the font data of Gothic font will be explained referring to FIGS. 7A-7C.

At the start of the boldface character-generating process, the CPU 31 determines the enlargement/reduction ratio for the reference pattern data 50a-50e based on the size information included in the drawing instruction (S210). Afterward, the CPU 31 selects (reads out) the reference pattern data 50b in the substantially square shape considering that the font of the character as the target of processing is Gothic font (S260) and generates reduced and substantially square pattern data shown in FIG. 7A according to the enlargement/reduction ratio determined in S210 (S270). Incidentally, the character as the target of processing is assumed to be smaller than the standard size in the example of FIG. 7A.

Figure 7C:
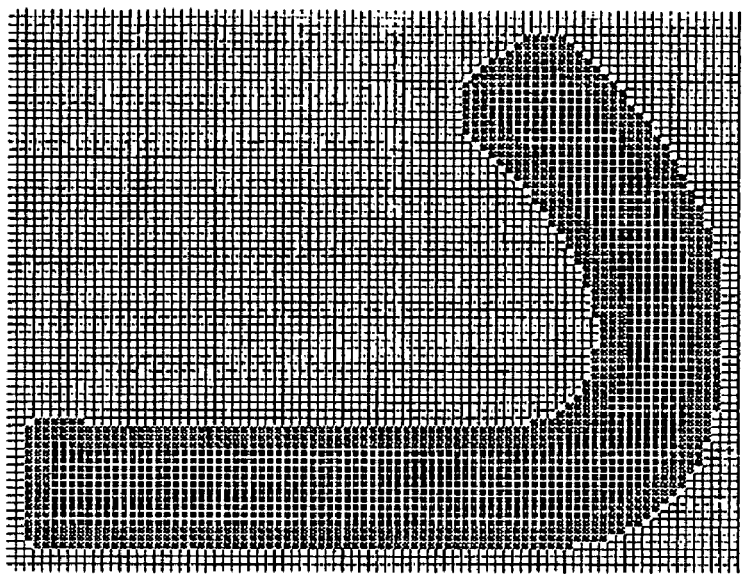
FIGS. 7A-7C are explanatory drawings showing an example of the boldface character generating process of the first embodiment for generating boldface form data from standard form data of a character in Gothic font.
Figure 7B:
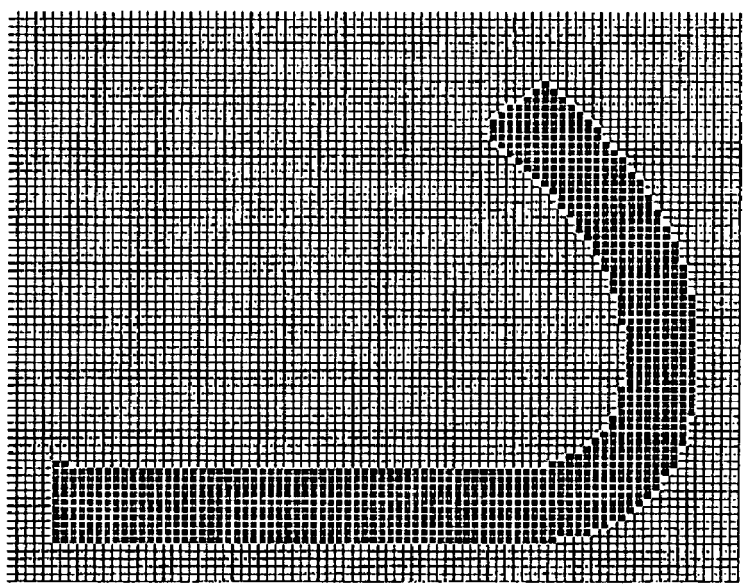

Subsequently, the CPU 31 generates bitmap data representing the Japanese character "shi" in Gothic font from the standard form data as shown in FIG. 7B (S280). In this step, the bitmap data is generated while making size adjustment to let the bitmap data be in the size specified by the size information. Thereafter, the CPU 31 generates the boldface form data from the bitmap data by enlarging the drawing area of the bitmap data generated in S280 as shown in FIG. 7C, by successively placing the reference dot S of the substantially square pattern data of FIG. 7A on each drawn dot of the bitmap data and drawing all the dots inside the "pattern area" (formed each time by the dots of the pattern data) as drawn dots (S290).

Figure 7A:
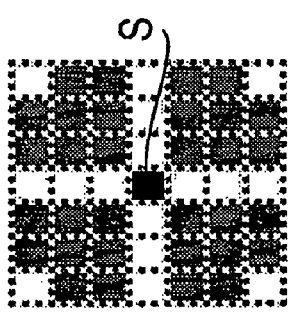

Here, the substantially square pattern data (FIG. 7A) generated in the example of FIGS. 7A-7C includes the reference dot S, three dots arranged to extend from the reference dot S in each of the four directions (upward, downward, rightward and leftward), three dots on each side of each dot vertically adjoining the reference dot S, three dots on each side of each second dot vertically from the reference dot S, and two dots on each side of each third dot vertically from the reference dot S.

By enlarging the drawing area of the bitmap data by use of such pattern data, each corner part of the enlarged drawing area is slightly more smoothed compared to that in the conventional method via the missing one dot at each of the four corners, by which edges of each character can be expressed finely similarly to the above example even when the Japanese character "shi" in Gothic font having an oblique element is converted into a boldface character.

Next, a case where boldface form data is generated from standard form data (of a character "Z" in this example) included in the font data of Century font will be explained referring to FIGS. 8A-8C.

At the start of the boldface character-generating process, the CPU 31 determines the enlargement/reduction ratio for the reference pattern data 50a-50e based on the size information included in the drawing instruction (S210). Afterward, the CPU 31 selects (reads out) the reference pattern data 50c in the diamond shape considering that the font of the character as the target of processing is Century font (S260) and generates reduced and diamond-shaped pattern data shown in FIG. 8A according to the enlargement/reduction ratio determined in S210 (S270). Incidentally, the character as the target of processing is assumed to be smaller than the standard size in the example of FIG. 8A.

Figure 8C:
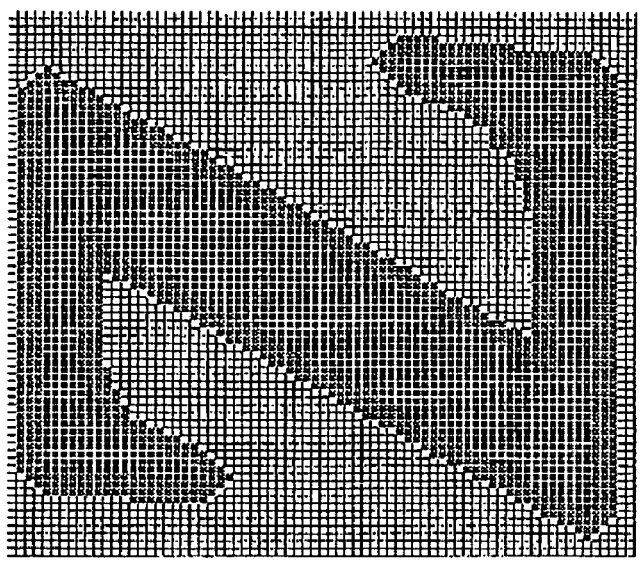
FIGS. 8A-8C are explanatory drawings showing an example of the boldface character generating process of the first embodiment for generating boldface form data from standard form data of a character in Century font.
Figure 8B:
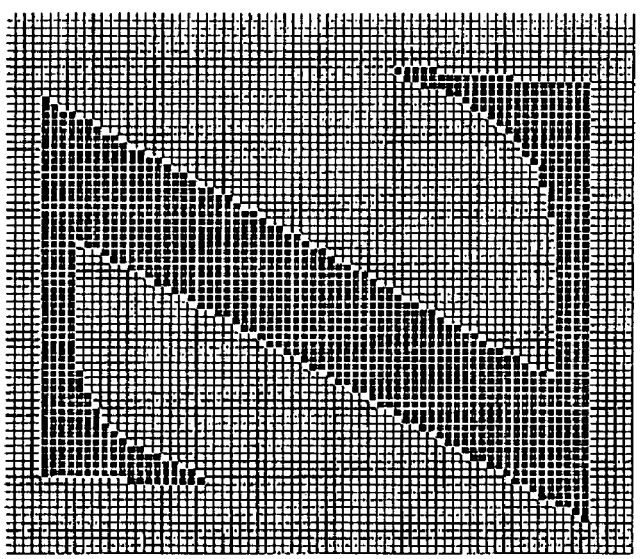

Subsequently, the CPU 31 generates bitmap data representing the character "Z" in Century font from the standard form data as shown in FIG. 8B (S280). In this step, the bitmap data is generated while making size adjustment to let the bitmap data be in the size specified by the size information. Thereafter, the CPU 31 generates the boldface form data from the bitmap data by enlarging the drawing area of the bitmap data generated in S280 as shown in FIG. 8C, by successively placing the reference dot S of the diamond-shaped pattern data of FIG. 8A on each drawn dot of the bitmap data and drawing all the dots inside the "pattern area" (formed each time by the dots of the pattern data) as drawn dots (S290).

Figure 8A:
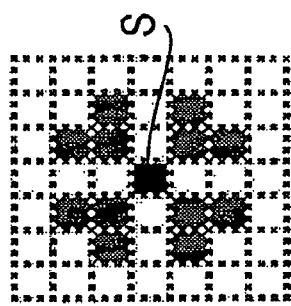

Here, the diamond-shaped pattern data (FIG. 8A) generated in the example of FIGS. 8A-8C includes the reference dot S, three dots arranged to extend from the reference dot S in each of the four directions (upward, downward, rightward and leftward), two dots on each side of each dot vertically adjoining the reference dot S, and one dot on each side of each second dot vertically from the reference dot S.

By enlarging the drawing area of the bitmap data by use of such pattern data, each corner part of the enlarged drawing area can be more smoothed (with the missing three dots arranged in the shape of a right triangle at each of the four corners) compared to that in the conventional method, by which edges of each character can be expressed finely even when a character having an oblique straight line (such as the character "Z" in Century font) is converted into a boldface character. Especially, each tip of a character having an acute angle (which is characteristic of Century font) can also be expressed beautifully.

Next, a case where italic boldface form data is generated from standard form data (of the Japanese character "shi" in this example) included in the font data of "Mincho" font will be explained referring to FIGS. 9A-9C.

At the start of the boldface character-generating process, the CPU 31 determines the enlargement/reduction ratio for the reference pattern data 50a-50e based on the size information included in the drawing instruction (S210). Afterward, the CPU 31 selects (reads out) the reference pattern data 50a in the round shape and the italic reference pattern data 50d considering that the character as the target of processing is not only in "Mincho" font but also in italic type (S250, S260) and generates pattern data shown in FIG. 9A for italic type by reducing the sizes of the two pieces of reference pattern data 50a and 50d according to the enlargement/reduction ratio determined in S210 and using the reduced reference pattern data 50a and 50d (S270). Incidentally, the character as the target of processing is assumed to be smaller than the standard size in the example of FIG. 9A.

Figure 9C:
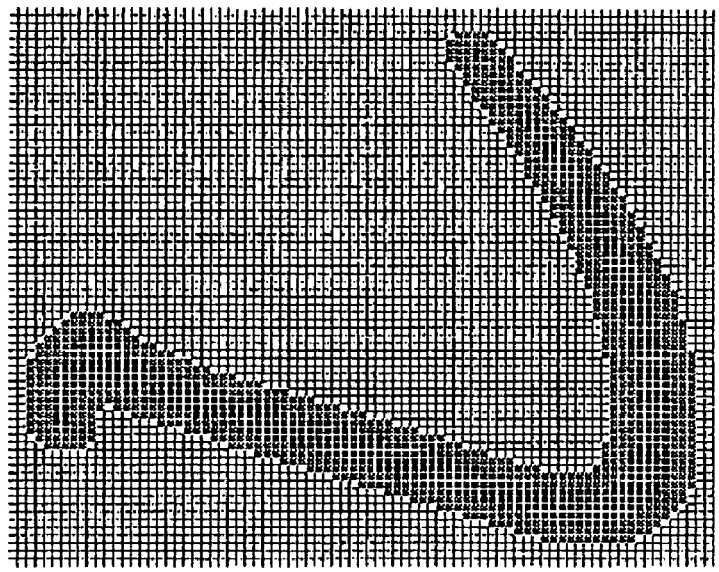
FIGS. 9A-9C are explanatory drawings showing an example of the boldface character generating process of the first embodiment for generating italic boldface form data from standard form data.
Figure 9B:
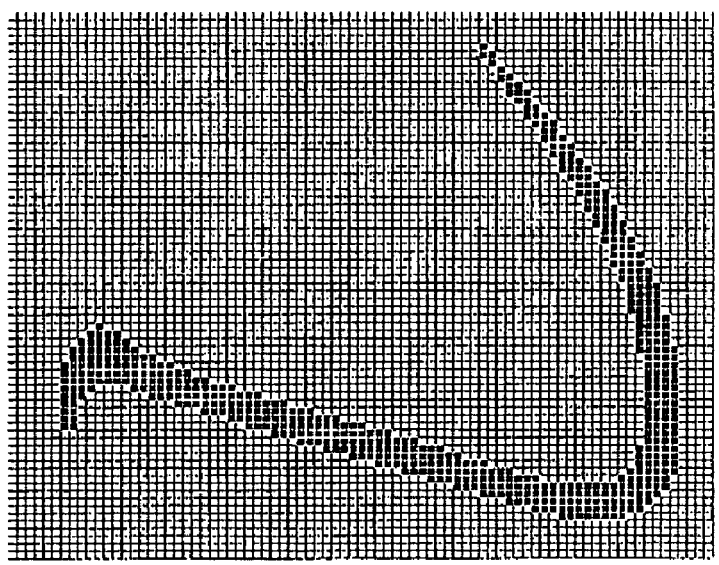

Subsequently, the CPU 31 generates bitmap data representing the Japanese character "shi" in "Mincho" font and in italic type from the standard form data as shown in FIG. 9B (S280). In this step, the bitmap data is generated while making size adjustment to let the bitmap data be in the size specified by the size information. Thereafter, the CPU 31 generates the boldface form data from the bitmap data by enlarging the drawing area of the bitmap data generated in S280 as shown in FIG. 9C, by successively placing the reference dot S of the round pattern data for italic type (FIG. 9A) on each drawn dot of the bitmap data and drawing all the dots inside the "pattern area" (formed each time by the dots of the pattern data) as drawn dots (S290).

Figure 9A:
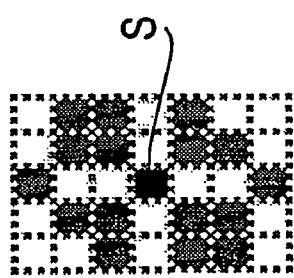

Here, the round pattern data for italic type (FIG. 9A) generated in the example of FIGS. 9A-9C includes the reference dot S, three dots arranged to extend vertically from the reference dot S in each of the upward direction and downward direction, two dots on each side of the reference dot S, two dots on each side of each dot vertically adjoining the reference dot S, one dot on the left of a second dot directly above the reference dot S, two dots on the right of the second dot directly above the reference dot S, two dots on the left of a second dot directly below the reference dot S, one dot on the right of the second dot directly below the reference dot S, one dot on the right of a third dot directly above the reference dot S, and one dot on the left of a third dot directly below the reference dot S.

In the example of FIGS. 9A-9C, the pattern data for italic type (FIG. 9A) has a substantially elliptical shape being leaned rightward by the prescribed angle (e.g. 71 degrees) and lacking one or more dots at each of the four corners. By enlarging the drawing area of the bitmap data by use of such pattern data for italic type, each corner part of the enlarged drawing area is smoothed in a leaned round shape compared to that in the conventional method, by which edges of each character can be expressed finely even when an italic character having a curved part and an oblique element like the so-called "tail" (such as the Japanese character "shi" in "Mincho" font) is converted into an italic boldface character.

Next, a case where boldface form data rotated by a certain angle (45 degrees in this example) is generated from standard form data (of the Japanese character "shi" in this example) included in the font data of Gothic font will be explained referring to FIGS. 10A-10C.

At the start of the boldface character generating process, the CPU 31 determines the enlargement/reduction ratio for the reference pattern data 50a-50e based on the size information included in the drawing instruction (S210). Afterward, the CPU 31 selects (reads out) the reference pattern data 50b in the substantially square shape and the rotational reference pattern data 50e considering that the font of the character as the target of processing is Gothic font and the character has a rotation angle specified by the rotation information included in the drawing instruction (S250, S260) and generates angular pattern data shown in FIG. 10A by reducing the sizes of the two pieces of reference pattern data 50b and 50e according to the enlargement/reduction ratio determined in S210 and using the reduced reference pattern data 50b and 50e (S270). Incidentally, the character as the target of processing is assumed to be smaller than the standard size in the example of FIG. 10A.

Figure 10C:
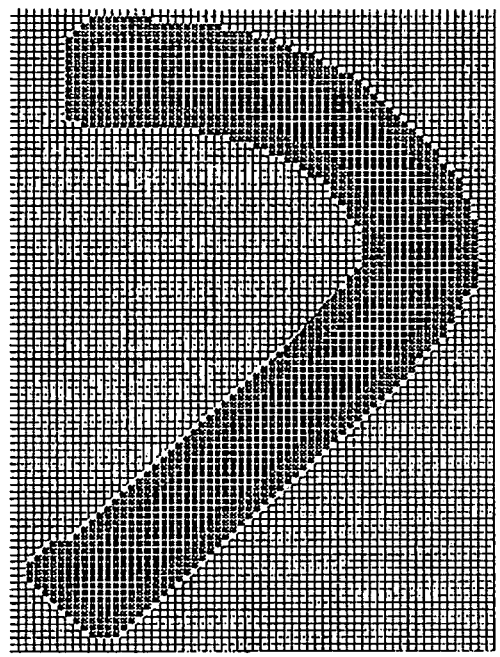
FIGS. 10A-10C are explanatory drawings showing an example of the boldface character generating process of the first embodiment for generating boldface form data rotated by a certain angle from standard form data.
Figure 10B:
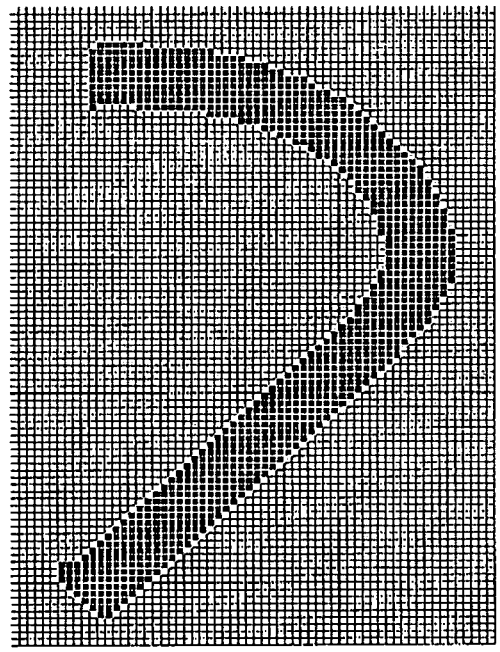

Subsequently, the CPU 31 generates bitmap data representing the Japanese character "shi" in Gothic font and in a state being rotated by 45 degrees (according to the rotation information) from the standard form data as shown in FIG. 10B (S280). In this step, the bitmap data is generated while making size adjustment to let the bitmap data be in the size specified by the size information. Thereafter, the CPU 31 generates the boldface form data from the bitmap data by enlarging the drawing area of the bitmap data generated in S280 as shown in FIG. 10C, by successively placing the reference dot S of the angular pattern data for rotation (FIG. 10A) on each drawn dot of the bitmap data and drawing all the dots inside the "pattern area" (formed each time by the dots of the pattern data) as drawn dots (S290).

Figure 10A:
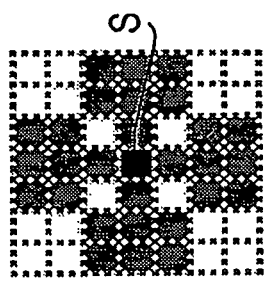

Here, the angular pattern data for rotation (FIG. 10A) generated in the example of FIGS. 10A-10C includes the reference dot S, three dots arranged to extend from the reference dot S in each of the four directions (upward, downward, rightward and leftward), three dots on each side of each dot vertically adjoining the reference dot S, two dots on each side of each second dot vertically from the reference dot S, and one dot on each side of each third dot vertically from the reference dot S.

In the example of FIGS. 10A-10C, the angular pattern data for rotation (FIG. 10A), used for the enlargement of the drawing area of the bitmap data, has a shape that is formed by rotating a substantially square pattern (lacking one dot at each of the four corners) by a prescribed angle (45 degrees in this example). By enlarging the drawing area of the bitmap data by use of such pattern data for rotation, the dots of the bitmap data are increased in directions suitable for the rotation angle of the character and each corner part of the enlarged drawing area is more smoothed compared to that in the conventional method thanks to the missing dot at each of the four corners (before rotation) of the pattern data, by which edges of each character can be expressed finely even when a character having an oblique element such as an oblique line and a curved part (such as the character "shi" rotated by 45 degrees) is converted into an italic boldface character.

As explained above, in the information processing device 30 in the image-formation system in accordance with the first embodiment of the present invention, the CPU 31 executes the boldface character generating process when it is judged that a character should be expressed in boldface type based on the style information included in the drawing instruction inputted from outside (S110: YES) and there exists no boldface form data of the character corresponding to the font information (S120: NO).

In the boldface character generating process, the CPU 31 generates the pattern data lacking at least one dot at each of the four corners (S270) and generates the boldface form data by enlarging the drawing area of the bitmap data based on the pattern data (S290).

Therefore, even when a character having an oblique element (such as an oblique line and a curved line) is converted into a boldface character, satisfactory result can be obtained as explained in the examples of FIGS. 6A-8C.

Further, even when an italic character or a rotated character is converted into a boldface character, the pattern data lacking at least one dot at each of the four corners is deformed/rotated based on the lean angle of italic type or the rotation angle specified by the rotation information included in the drawing instruction and the boldface form data is generated by use of the deformed/rotated pattern data, by which satisfactory results can be achieved as explained in the examples of FIGS. 9A-10C. Specifically, in the case where the italic type information is included in the drawing instruction, the boldface character (boldface form data) is generated by use of the italic pattern data (in which the number of dots to be increased in the horizontal and vertical directions has been adjusted based on the lean angle of italic type), by which fine-looking boldface form data can be generated even for italic characters which are formed mainly of oblique lines and curves.

Also in the case where the rotation information is included in the drawing instruction, the boldface character (boldface form data) is generated by use of the pattern data for rotation (in which the number of dots to be increased in the horizontal and vertical directions has been adjusted according to the rotation angle specified by the rotation information), by which fine-looking boldface form data can be generated even for rotated characters which have come to include oblique elements due to the rotation.

Further, in the first embodiment, the boldface character (boldface form data) is generated in the step S290 of the boldface character-generating process (FIG. 5) by successively enlarging the drawing area of each drawn dot of the bitmap data generated in S280, by which the boldface character can be generated in a simple process.

Since the pattern data to be used for the step S290 is changed (properly selected from the reference pattern data 50a-50e) based on the font ("Mincho" font, Gothic font, Century font, etc.) of the character, the boldface character-generating process can be executed properly to suit the font, by which more satisfactory result can be obtained.

Furthermore, in the first embodiment, the reference pattern data 50a-50e are used after being enlarged/reduced based on the size information (representing the size of the character) included in the drawing instruction, the boldface character generating process can be executed properly to suit the size of the character, by which still more satisfactory result can be obtained.

Second Embodiment

Figure 11:
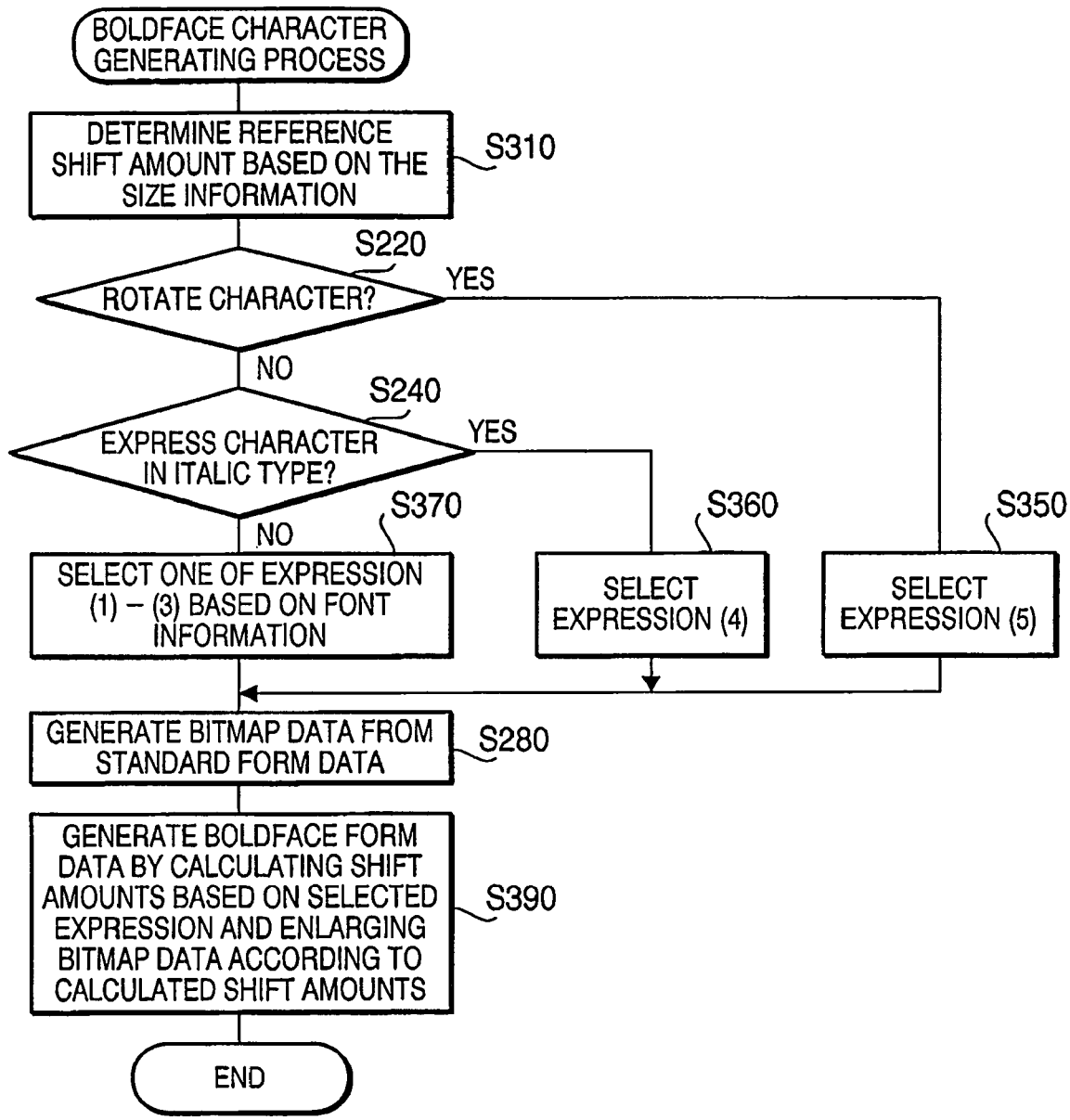
FIG. 11 is a flow chart showing a boldface character generating process executed in an image-formation system in accordance with a second embodiment of the present invention.

In the following, an image-formation system in accordance with a second embodiment of the present invention will be described referring to FIGS. 11-16. FIG. 11 is a flow chart showing a boldface character generating process which is executed by the CPU 31 of the information processing device 30 in the second embodiment, wherein steps identical with those in the first embodiment are indicated with the same step numbers and thus repeated explanation thereof is omitted for brevity.

The image-formation system of the second embodiment is configured similarly to the system of the first embodiment, except that the information processing device 30 executes a boldface character generating process shown in FIG. 11 instead of the boldface character generating process of FIG. 5. In the boldface character generating process of FIG. 11, the CPU 31 of the information processing device 30 generates the boldface form data from the standard form data by use of a mathematical expression selected from the following expressions (1)-(5), instead of using the aforementioned reference pattern data 50a-50e and the pattern data generated therefrom.

$$x = \frac{\sum_{n=10y-4}^{10y+5} 0.1\sqrt{\left|a^2 - \left(\frac{n}{10}\right)^2\right|}}{10} \quad (1 \le y \le a) \quad (1)$$

$$\left. \begin{array}{l} x = a - 1 \quad (y = a) \\ x = a \quad (1 \le y \le a - 1) \end{array} \right\} \quad (2)$$

$$x = a - y \quad (1 \le y \le a) \quad (3)$$

$$\left. \begin{array}{l} x' = y/\tan 71° \quad (1 \le y \le a) \\ x = x' + (a - 1) \end{array} \right\} \quad (4)$$

$$\left. \begin{array}{l} x = x'\cos\beta - y'\sin\beta \\ y = y'\sin\beta + y'\cos\beta \end{array} \right\} \quad (5)$$

Each of the above expressions (1)-(5) represents a function for obtaining each shift amounts "x" in the horizontal direction (X direction) from the shift amount "y" in the vertical direction (Y direction) when the shift amount "y" is increased from 1 to the reference shift amount "a" in units of dots.

When the expression (1) is used, the values of x are successively obtained within the range "$1 \le y \le a$" by substituting the reference shift amount "a" into the variable "a" of the expression (1). In other words, each value of x (indicating how long (how many dots) the bitmap data should be shifted in the X direction when the bitmap data is shifted in the Y direction dot by dot) is calculated for each y within the range "$1 \le y \le a$". Here, the meaning of the "shift amount" is as follows: When the shift amount for the bitmap data (generated from the standard form data in the first embodiment) in the X direction is four dots when the bitmap data is shifted in the Y direction by one dot, for example, it means that the bitmap data is drawn while shifting its drawing area in the Y direction by one dot and the drawing of the bitmap data is further repeated four times while successively shifting the drawing area in the X direction dot by dot. By repeating such a sequence (drawing of the bitmap data for a number of specified times while shifting the drawing area) until y (shift amount in the Y direction) reaches the reference shift amount "a" (y=a), a pattern similar to the pattern obtained by use of the reference pattern data 50a shown FIG. 3A (in the boldface character generating process of the first embodiment) can be obtained eventually. Incidentally, x (shift amount in the X direction) basically takes on "a" when y=0. While only a function for the first quadrant (upper right quadrant) of the X-Y coordinates is shown in the expression (1), functions for the second through fourth quadrants can be obtained by properly inverting the sign in the expression (1) (ditto for the expressions (2)-(5)). In the second embodiment, the decimal part of the value x obtained by the expression (1) is rounded off.

Also when the expression (2) is used, the values of x are successively obtained from the expression (2) within the range "$1 \le y \le a$" and the drawing of the bitmap data (generated from the standard form data) is repeated while shifting its drawing area as explained above. Similar procedures are executed also for the second through fourth quadrants, by which a pattern similar to the pattern obtained by use of the reference pattern data 50b shown in FIG. 3B (in the boldface character generating process of the first embodiment) can be obtained.

By use of the expression (3), a result similar to the result obtained by use of the reference pattern data 50c shown in FIG. 3C (in the boldface character generating process of the first embodiment) can be obtained. By use of the expression (4), a result similar to the result obtained by use of the italic reference pattern data 50d shown in FIG. 3D (in the boldface character generating process of the first embodiment) can be obtained. By use of the expression (5), a result similar to the result obtained by use of the rotational reference pattern data 50e shown in FIG. 3E (in the boldface character generating process of the first embodiment) can be obtained.

In the boldface character generating process in the second embodiment, the boldface form data is generated from the standard form data by calculating the shift amounts (to be used for the shifting of the drawing area of the bitmap data generated from the standard form data) using a mathematical expression selected from the expressions (1)-(5) and enlarging the drawing area of the bitmap data by successively shifting the whole drawing area of the bitmap data according to the calculated shift amounts.

In the second embodiment, the expression (1) is selected when the font (specified by the font information included in the drawing instruction) is "Mincho" font, the expression (2) is selected when the font is Gothic font, and the expression (3) is selected when the font is Century font. The expression (4) is selected when the italic type information is included in the drawing instruction. The expression (5) is selected when the rotation information is included in the drawing instruction.

In the following, the boldface character generating process executed by the CPU 31 of the information processing device 30 in the second embodiment will be explained referring to a flow chart of FIG. 11.

As shown in FIG. 11, at the start of the boldface character generating process, the CPU 31 determines the reference shift amount "a" (indicating how many dots the drawing area of the bitmap data generated from the standard form data has to be shifted at most in the horizontal or vertical direction for the conversion into the boldface form data) based on the size information included in the drawing instruction (S310). Incidentally, an optimum value for the reference shift amount "a" for the conversion into the boldface form data has previously been set in regard to each size of character to be processed.

In the next step S220, the CPU 31 checks whether or not the rotation information is included in the drawing instruction. If the rotation information is included in the drawing instruction (S220: YES), the CPU 31 selects the expression (5) (S350) and thereafter advances to step S280. On the other hand, if no rotation information is included in the drawing instruction (S220: NO), the process advances to step S240.

In the step S240, the CPU 31 checks whether or not the italic type information is included in the drawing instruction. If the italic type information is included in the drawing instruction (S240: YES), the CPU 31 selects the expression (4) (S360) and thereafter advances to the step S280. On the other hand, if no italic type information is included in the drawing instruction (S240: NO), the process advances to step S370.

In the step S370, the CPU 31 selects one of the expressions (1)-(3) based on the font information included in the drawing instruction. Thereafter, the process advances to the step S280.

In the step S280, the CPU 31 generates bitmap data from the standard form data. In this step, the bitmap data is generated while making size adjustment as needed to let the bitmap data be in the size specified by the size information. Thereafter, the process advances to step S390.

In the step S390, the CPU 31 generates the boldface form data from the bitmap data generated in the step S280. Specifically, the CPU 31 calculates actual shift amounts (i.e. shift amounts obtained by adjusting the reference shift amount "a" determined in the step S310) by substituting the reference shift amount "a" into the coefficient "a" of the expression selected in the steps S350-S370, and enlarges the drawing area of the bitmap data by successively drawing the bitmap data (placing the drawn dots of the bitmap data) while shifting its drawing area in the horizontal and vertical directions according to the calculated shift amounts, by which the boldface form data is generated. Thereafter, the boldface character generating process of FIG. 11 is ended.

In a case where boldface form data is generated by the above boldface character generating process of FIG. 11 from standard form data of the Japanese character "shi" included in the font data of "Mincho" font, the shift amounts are calculated by use of the expression (1) and the drawing of the bitmap data generated from the standard form data is repeated according to the calculated shift amounts, by which a result similar to FIG. 6C explained in the first embodiment can be obtained.

Specifically, focusing on each drawn dot of the bitmap data, the shift amounts calculated by the expression (1) (for the enlargement of the drawing area of the particular drawn dot of the bitmap data in "Mincho" font in the boldface character generating process of FIG. 11) eventually become equivalent to the entire area formed by the dots of the pattern data of FIG. 6A used in the first embodiment, by which effects similar to those of the example of FIGS. 6A-6C in the first embodiment can be achieved.

In a case where boldface form data is generated by the boldface character generating process of FIG. 11 from standard form data of the Japanese character "shi" included in the font data of Gothic font, a result similar to FIG. 7C explained in the first embodiment can be obtained by use of the expression (2).

Specifically, focusing on each drawn dot of the bitmap data, the shift amounts calculated by the expression (2) (for the enlargement of the drawing area of the particular drawn dot of the bitmap data in Gothic font in the boldface character generating process of FIG. 11) eventually become equivalent to the entire area formed by the dots of the pattern data of FIG. 7A used in the first embodiment, by which effects similar to those of the example of FIGS. 7A-7C in the first embodiment can be achieved.

In a case where boldface form data is generated by the boldface character generating process of FIG. 11 from standard form data of the character "Z" included in the font data of Century font, a result similar to FIG. 8C explained in the first embodiment can be obtained by use of the expression (3).

Specifically, focusing on each drawn dot of the bitmap data, the shift amounts calculated by the expression (3) (for the enlargement of the drawing area of the particular drawn dot of the bitmap data in Century font in the boldface character generating process of FIG. 11) eventually become equivalent to the entire area formed by the dots of the pattern data of FIG. 8A used in the first embodiment, by which effects similar to those of the example of FIGS. 8A-8C in the first embodiment can be achieved.

Next, a case where italic boldface form data is generated from standard form data (of a character "Z" in this example) included in the font data of Century font will be explained referring to FIGS. 12A-12C.

Figure 12A:
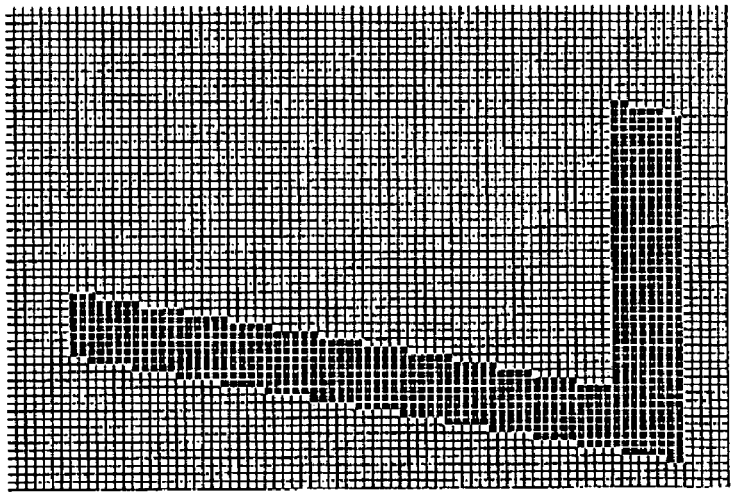
FIGS. 12A-12C are explanatory drawings showing an example of the boldface character generating process of the second embodiment for generating italic boldface form data from standard form data.

After determining the reference shift amount "a" at the start of the boldface character generating process (S310), the CPU 31 of the information processing device 30 selects the expression (4) (S360) and generates bitmap data representing the character "Z" in Century font and in italic type (in which the character has been deformed (leaned) by the prescribed angle of italic type) from the standard form data as shown in FIG. 12A (S280).

Figure 12B:
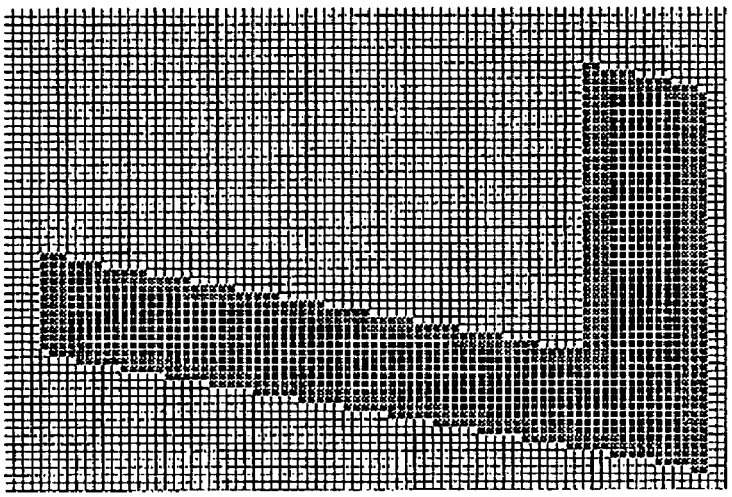

Subsequently, the CPU 31 calculates the actual shift amounts by substituting the reference shift amount "a" (a=3 in the example of FIGS. 12A-12C) into the expression (4) and generates the boldface form data as shown in FIG. 12B by enlarging the drawing area of the bitmap data according to the calculated shift amounts (S390).

Figure 12C:
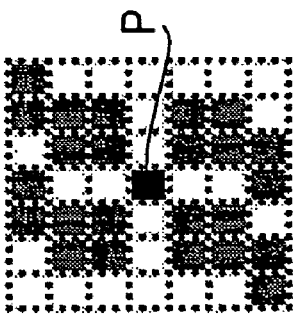

In the example of FIGS. 12A-12C, the shift amounts calculated from the expression (4) in regard to the first quadrant are as follows:

x=2 when y=0
x=2 when y=1
x=2 when y=2
x=3 when y=3

The shift amounts are calculated also for the second through fourth quadrants in similar ways. Focusing on each drawn dot P of the bitmap data to be processed (which corresponds to the black dot in FIG. 12C), the result obtained by the repetition of the drawing of the particular drawn dot while shifting its position in the horizontal and vertical directions (X and Y directions) according to the calculated shift amounts eventually equals the state (pattern) shown in FIG. 12C. Specifically, the drawn dot is shifted from the original position P rightward and leftward by two dots respectively, shifted from the original position P upward and downward by one dot respectively and further shifted rightward and leftward by two dots respectively, shifted from the original position P upward and downward by two dots respectively and further shifted rightward and leftward by two dots respectively, shifted from the original position P upward by three dots and further shifted rightward by three dots while also being shifted leftward by one dot, and shifted from the original position P downward by three dots and further shifted rightward by one dot while being also shifted leftward by three dots.

As above, in the example of FIGS. 12A-12C, the enlarged area for each drawn dot P of the bitmap data (obtained in the enlargement of the drawing area of the bitmap data) substantially forms a parallelogram which is leaned rightward by the prescribed angle (71 degrees in this embodiment).

Therefore, even when an italic character (which tends to include oblique elements like oblique lines and curves) is converted into a boldface character, the shift amounts in the X and Y directions are properly adjusted by the expression (4) (which considers that the character is in italic type) as shown in FIG. 12C, by which edges of each character can be expressed finely.

Next, a case where boldface form data rotated by a certain angle (45 degrees in this example) is generated from standard form data (of a character "L" in this example) included in the font data of Century font will be explained referring to FIGS. 13A-13C.

Incidentally, the following explanation of the example of FIGS. 13A-13C will be given taking the simplest example in which the expression (5) for rotation is applied to shift amounts (x, y) obtained by the simplest expression "x=a" corresponding to a square pattern (in which x constantly takes on a when y is increased from 0 to a) irrespective of the font of the character, for easy understanding of the explanation. In the example of FIGS. 13A-13C, the reference shift amount "a" (in the rotated state) is 4.

Figure 13C:
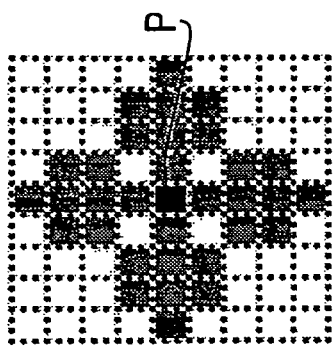
FIGS. 13A-13C are explanatory drawings showing an example of the boldface character generating process of the second embodiment for generating boldface form data rotated by a certain angle from standard form data.
Figure 13B:
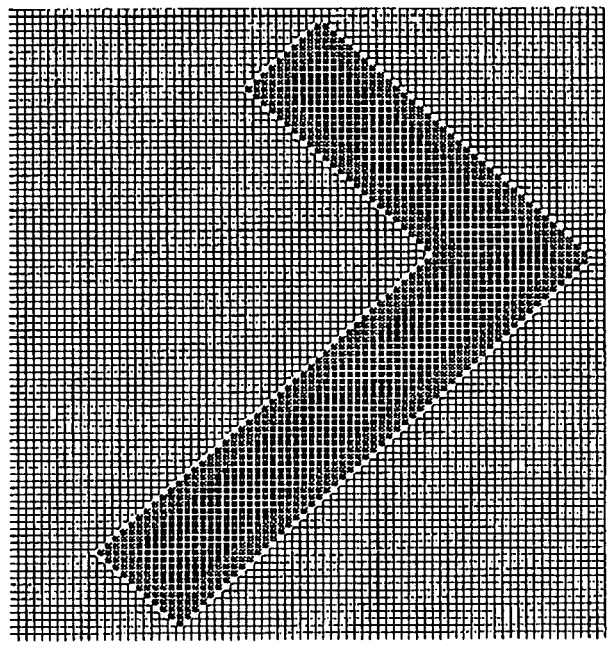
Figure 13A:
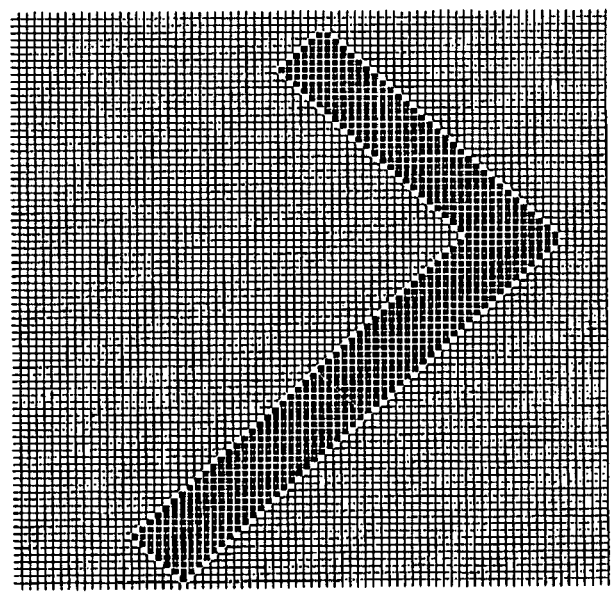

As shown in FIG. 13A, the CPU 31 generates rotational bitmap data representing the character "L" in Century font and in a state being rotated by the prescribed angle according to the rotation information (45 degrees in this example) from the standard form data (S280). The actual shift amounts taking the rotation angle into consideration can be calculated by substituting the values x and y obtained from the above simplest expression into the variables x' and y' of the expression (5) while substituting the rotation angle into the coefficient β of the expression (5). By use of the shift amounts calculated as above, the CPU 31 generates the boldface form data (in which the drawing area of the bitmap data has been enlarged according to the calculated shift amounts) as shown in FIG. 13B (S390).

In the example of FIGS. 13A-13C, the shift amounts calculated from the expression (5) in regard to the first quadrant are as follows:

x=4 when y=0
x=3 when y=1
x=2 when y=2
x=1 when y=3
x=0 when y=4

The shift amounts are calculated also for the second through fourth quadrants in similar ways. Focusing on each drawn dot P of the bitmap data to be processed, the result obtained by the repetition of the drawing of the particular drawn dot while shifting its position in the horizontal and vertical directions (X and Y directions) according to the calculated shift amounts eventually equals the state (pattern) shown in FIG. 13C. Specifically, the drawn dot is shifted from the original position P rightward and leftward by four dots respectively, shifted from the original position P upward and downward by one dot respectively and further shifted rightward and leftward by three dots respectively, shifted from the original position P upward and downward by two dots respectively and further shifted rightward and leftward by two dots respectively, shifted from the original position P upward and downward by three dots respectively and further shifted rightward and leftward by one dot respectively, and shifted from the original position P upward and downward by four dots respectively.

As above, in the example of FIGS. 13A-13C, the enlarged area for each drawn dot P of the bitmap data (obtained in the enlargement of the drawing area of the bitmap data) forms a diamond shape which is obtained by rotating a square (having two horizontal sides and two vertical sides) by 45 degrees.

Therefore, even when a rotated standard character (which have come to include oblique elements due to the rotation) is converted into a boldface character, the shift amounts in the X and Y directions are properly adjusted by the expression (5) (which takes the rotation angle into consideration) as shown in FIG. 13C, by which edges of each character can be expressed finely.

Incidentally, while the above example of FIGS. 13A-13C has been explained taking the simplest example in which the expression (5) for rotation is applied to the simplest expression "x=a", it is also possible to take advantages of the effects of each of the aforementioned boldface character generating processes (using the expressions (1)-(4) respectively) while applying the above example to various characters (characters in various fonts) having a certain rotation angle, by selecting one of the expressions (1)-(4) depending on the font of the character to be rotated and depending on whether the character is in italic type or not, calculating the values of x and y by use of the selected expression, and substituting the calculated values x and y into the variables x' and y' of the expression (5).

As explained above, in the information processing device 30 in the image-formation system in accordance with the second embodiment of the present invention, when the boldface form data is generated from the standard form data by the boldface character-generating process, the CPU 31 determines the reference shift amount "a" in the horizontal and vertical directions for the standard form data based on the size information included in the drawing instruction (S310), calculates the actual shift amounts (adjusted shift amounts) in the horizontal and vertical directions by selecting a suitable expression from the expressions (1)-(5) based on information included in the drawing instruction (representing the font of the character to be processed, whether the character is in italic type or not, and whether the character has a rotation angle or not) and performing a calculation using the selected expression and the reference shift amount "a", and generates the boldface form data from the standard form data by repeating the drawing (of the standard form data or bitmap data) while shifting the drawing area in the horizontal and vertical directions according to the calculated shift amounts (S390).

By the information processing device 30 of the second embodiment configured as above, the shift amounts in the horizontal and vertical directions are adjusted by use of the expressions (1)-(3) so that the drawing result (enlarged area) for each drawn dot P of the bitmap data will lack at least one dot at each of the four corners, by which satisfactory result can be obtained as mentioned above even when a standard character having an oblique element (e.g. oblique line, curved part, starting point, ending point (like the so-called "tail")) is converted into a boldface character.

When the italic type information is included in the drawing instruction, the shift amounts in the horizontal and vertical directions are adjusted by use of the expression (4) which considers that the character to be processed is in italic type, by which oblique parts in the generated boldface character can be expressed finely as mentioned above even when an italic character is converted into a boldface character.

When the rotation information is included in the drawing instruction, the shift amounts in the horizontal and vertical directions are adjusted by use of the expression (5) which considers that the character has a rotation angle, by which oblique parts in the generated boldface character can be expressed finely as mentioned above even when a rotated character is converted into a boldface character.

Since the shift amounts in the horizontal and vertical directions can be adjusted in the second embodiment by properly using one of the expressions (1)-(3) depending on the font of the character, more satisfactory result can be achieved.

Further, the boldface character-generating process in the second embodiment can be executed at high speed since the process is only required to calculate each shift amount (i.e. the number of repetitions of drawing) by use of the expressions (1)-(5).

While a description has been given above of preferred embodiments in accordance with the present invention, the present invention is not to be restricted by the particular illustrative embodiments and a variety of modifications, design changes, etc. are possible without departing from the scope and spirit of the present invention described in the appended claims.

For example, while the information processing device 30 in the first embodiment is configured to execute the drawing area enlargement in regard to each drawn dot of the bitmap data, the information processing device 30 may also be configured to enlarge the whole drawing area of the bitmap data at once.

While the reference pattern data 50a-50e are prestored in the storage unit 37 of the information processing device 30 in the first embodiment, the information processing device 30 may also be configured to generate a piece of pattern data based on a prescribed mathematical expression and generate the boldface form data from the standard form data by use of the generated pattern data.

The multiple pieces of reference pattern data (50a-50e in the first embodiment) may further include square pattern data (lacking no corner dot, to be used for enlarging the drawing area of the bitmap data by the same number of dots equally in the four directions) so that the square pattern data can be selected and used depending on the form of the character to be processed (ditto for the expressions (1)-(5) in the second embodiment).

While the present invention is applicable to an information processing device 30 irrespective of the OS (Operating System) installed in the device, excellent results can be achieved especially when Windows® 2000 or NT has been installed in the information processing device as the OS. In the process for generating the boldface form data from the standard form data, the CPU 31 operating with such an OS can not execute the process effectively even by use of the GDI (Graphics Device Interface) functions of Windows® and can fail to generate the boldface form data successfully. Therefore, it is effective to apply the present invention to information processing devices operating with such an OS.

What is claimed is:

1. An image-processing device comprising:
a storage unit which stores font data of each character with standard form data for each of a plurality of prescribed fonts, the font data comprising a character code specifying the character and form data representing form of the character specified by the character code;
a judgment unit which judges, upon receiving a drawing instruction which comprises a character code specifying a character, font information specifying a font type, font size information specifying a font size and style information specifying whether or not to express the character in boldface type, whether each character should be expressed in boldface type or not based on the style information in the drawing instruction;
a boldface data-generating unit which generates boldface form data of the character, when the judgment unit judges that the character should be expressed in boldface type, by reading out the standard form data of the character corresponding to the font type specified by the font information comprised in the drawing instruction from the storage unit, determining shift amounts in horizontal and vertical directions based on the font size information comprised in the drawing instruction, each of the shift amounts specifying horizontal shift amounts and vertical shift amounts, and repeating drawing of the standard form data by shifting the standard form data in the horizontal and vertical directions according to the determined shift amounts; and
an output unit which converts the boldface form data generated by the boldface data-generating unit into image-formation data and outputs the image-formation data to an image-formation device which forms an image according to the image-formation data,
wherein the boldface data-generating unit comprises a shift amount adjustment unit which adjusts the shift amounts in the horizontal and vertical directions so that result of repeating drawing of a dot of the standard form data by shifting the standard form data in the horizontal and vertical directions according to the shift amounts to draw a matrix lacks one or more dots at each of four corners of the matrix, and
wherein the boldface data-generating unit generates the boldface form data by repeating the drawing of the standard form data according to the shift amounts in the horizontal and vertical directions adjusted by the shift amount adjustment unit.

2. The image-processing device according to claim 1, wherein the shift amount adjustment unit adjusts the shift amounts by using at least one of a plurality of adjustment patterns varying in the positions and number of lacking dots at each of the four corners of the matrix, and
wherein the shift amount adjustment unit makes the adjustment of the shift amounts by selecting one of the plurality of adjustment patterns according to the font type specified by the font information from the plurality of adjustment patterns.

3. The image-processing device according to claim 2, wherein the shift amount adjustment unit comprises a plurality of mathematical expressions corresponding to the plurality of adjustment patterns respectively, and
wherein the shift amount adjustment unit determines the shift amounts using a mathematical expression corresponding to each adjustment pattern.

4. An image-processing device comprising:
a storage unit which stores font data of each character, the font data comprising a character code specifying the character and form data representing form of the character specified by the character code, the form data comprising standard form data for each of the plurality of prescribed fonts;

a judgment unit which judges, upon receiving a drawing instruction comprising a character code specifying a character, font information specifying a font type and style information specifying whether or not to express the character in boldface type, whether each character should be expressed in boldface type or not based on the style information comprised in the drawing instruction;

a boldface data-generating unit which reads out the standard form data of the character corresponding to the font type specified by the font information comprised in the drawing instruction from the storage unit and generates boldface form data of the character from the standard form data when the judgment unit judges that the character should be expressed in boldface type; and an output unit which converts the boldface form data generated by the boldface data-generating unit into image-formation data and outputs the image-formation data to an image-formation device which forms an image according to the image-formation data, wherein the boldface data-generating unit comprises a pattern data storage unit which stores pattern data made of a plurality of dots extending from a prescribed reference dot in a matrix which lacks at least one dot at each of four corners of the matrix, and wherein the boldface data-generating unit generates the boldface form data by generating drawing data which expresses the character by using drawn dots to be drawn and undrawn dots not to be drawn based on the standard form data read out from the storage unit, reading out the pattern data from the pattern data storage unit, and enlarging a drawing area of the drawing data based on the pattern data.

5. The image-processing device according to claim 4, wherein the boldface data-generating unit generates the boldface form data by enlarging the drawing area of the drawing data, by successively placing the prescribed reference dot of the pattern data on each drawn dot of the drawing data and drawing all the dots inside a pattern area, formed each time by the dots of the pattern data, as drawn dots.

6. The image-processing device according to claim 4, wherein the pattern data storage unit stores multiple pieces of pattern data in different shapes, and wherein the boldface data-generating unit reads out pattern data corresponding to the font type specified by the font information from the pattern data storage unit for the generation of the boldface form data.

7. The image-processing device according to claim 4, wherein the drawing instruction comprises font size information specifying a font size, and wherein the boldface data-generating unit enlarges or shrinks the pattern data read out from the pattern data storage unit based on the font size specified by the font size information for the generation of the boldface form data.

8. The image-processing device according to claim 4, wherein the drawing instruction comprises italic type information specifying that the character should be expressed in italic type, wherein the judgment unit further judges whether or not the italic type information is comprised in the drawing instruction, and wherein, when the judgment unit judges that the italic type information is comprised in the drawing instruction and the character should be expressed in boldface type, the boldface data-generating unit generates the drawing data for italic type by deforming the standard form data based on a prescribed lean angle of italic type, reads out the pattern data from the pattern data storage unit, generates pattern data for italic type by deforming dot arrangement of the pattern data read out from the pattern data storage unit around the prescribed reference dot based on the lean angle, and generates the boldface form data by using the drawing data for italic type and the deformed pattern data for italic type.

9. The image-processing device according to claim 4, wherein the drawing instruction comprises rotation information specifying rotation of the entire character, and wherein the judgment unit further judges whether or not the rotation information is comprised in the drawing instruction, and wherein, when the judgment unit judges that the rotation information is comprised in the drawing instruction and the character should be expressed in boldface type, the boldface data-generating unit generates the drawing data for rotation by rotating the standard form data based on an angle specified by the rotation information, reads out the pattern data from the pattern data storage unit, generates pattern data for rotation by rotating dot arrangement of the pattern data read out from the pattern data storage unit around the prescribed reference dot by a rotation angle corresponding to the rotation information, and generates the boldface form data by using the drawing data for rotation and the rotated pattern data for rotation.

10. An image-processing device comprising:

a storage unit which stores font data of each character with standard form data for each of a plurality of prescribed fonts, the font data comprising a character code specifying the character and form data representing form of the character specified by the character code;

a judgment unit which judges, upon receiving a drawing instruction comprising a character code specifying a character, font information specifying a font type, font size information specifying a font size, and style information specifying whether or not to express the character in boldface type, whether each character should be expressed in boldface type or not based on the style information comprised in the drawing instruction;

a boldface data-generating unit which generates boldface form data of the character, when the judgment unit judges that the character should be expressed in boldface type, by reading out the standard form data of the character corresponding to the font type specified by the font information in the drawing instruction from the storage unit, determining shift amounts in horizontal and vertical directions based on the font size information comprised in the drawing instruction, each of the shift amounts specifying horizontal shift amounts and vertical shift amounts, the shift amounts being determined so that result of repeating drawing of a dot of the standard form data by shifting the standard form data in the horizontal and vertical directions according to the shift amounts to draw a matrix lacks one or more dots at each of four corners of the matrix, and repeating drawing of the standard form data by shifting the standard form data in the horizontal and vertical directions according to the determined shift amounts; and an output unit which converts the boldface form data generated by the boldface data-generating unit into image-formation data and outputs the image-formation data to an image-formation device which forms an image according to the image-formation data, wherein the drawing instruction comprises italic type information specifying that the character should be expressed in italic type, wherein the judgment unit further judges whether or not the italic type information is comprised in the drawing instruction, wherein the boldface data generating unit comprises a shift amount adjustment unit which adjusts the shift amounts in the horizontal and vertical directions based on the font size information and the italic type information, and wherein, when the judgment unit judges that the italic type information is comprised in the drawing instruction and the character should be expressed in boldface type, the boldface data generating unit generates the boldface form data by generating form data for italic type by deforming the standard form data based on a prescribed lean angle of italic type and repeating drawing of the form data for italic type according to the shift amounts determined by the shift amount adjustment unit.

11. The image-processing device according to claim 10, wherein the shift amount adjustment unit determines the shift amounts by using a mathematical expression which has been prepared corresponding to the italic type information.

12. An image-processing device comprising:

a storage unit which stores font data of each character with standard form data for each of a plurality of prescribed fonts, the font data comprising a character code specifying the character and form data representing form of the character specified by the character code;

a judgment unit which judges, upon receiving a drawing instruction comprising a character code specifying a character, font information specifying a font type, font size information specifying a font size, and style information specifying whether or not to express the character in boldface type, whether each character should be expressed in boldface type or not based on the style information comprised in the drawing instruction;

a boldface data-generating unit which generates boldface form data of the character, when the judgment unit judges that the character should be expressed in boldface type, by reading out the standard form data of the character corresponding to the font type specified by the font information comprised in the drawing instruction from the storage unit, determining shift amounts in horizontal and vertical directions based on the font size information comprised in the drawing instruction, each of the shift amounts specifying horizontal shift amounts and vertical shift amounts, the shift amounts being determined so that result of repeating drawing of a dot of the standard form data by shifting the standard form data in the horizontal and vertical directions according to the shift amounts to draw a matrix lacks one or more dots at each of four corners of the matrix, and repeating drawing of the standard form data by shifting the standard form data in the horizontal and vertical directions according to the determined shift amounts; and an output unit which converts the boldface form data generated by the boldface data-generating unit into image-formation data and outputs the image-formation data to an image-formation device which forms an image according to the image-formation data, wherein the drawing instruction comprises rotation information specifying rotation of the entire character, wherein the judgment unit further judges whether or not the rotation information is comprised in the drawing instruction, wherein the boldface data-generating unit comprises a shift amount adjustment unit which adjusts the shift amounts in the horizontal and vertical directions based on the font size information and the rotation information, and wherein, when the judgment unit judges that the rotation information is comprised in the drawing instruction and the character should be expressed in boldface type, the boldface data-generating unit generates the boldface form data by generating form data for rotation by rotating the standard form data based on an angle specified by the rotation information and repeating drawing of the form data for rotation according to the shift amounts determined by the shift amount adjustment unit.

13. The image-processing device according to claim 12, wherein the shift amount adjustment unit determines the shift amounts by using a mathematical expression which has been prepared corresponding to the rotation information.

14. An image-processing device comprising:

a storage unit which stores font data of each character, the font data comprising a character code specifying the character and form data representing form of the character specified by the character code, the form data comprising standard form data in each of a plurality of prescribed fonts;

a judgment unit which judges, upon receiving the drawing instruction comprising a character code specifying a character, font information specifying a font type, and style information specifying whether or not to express the character in boldface type, whether each character should be expressed in boldface type or not based on the style information comprised in the drawing instruction;

a boldface data-generating unit which reads out the standard form data of the character corresponding to the font type specified by the font information comprised in the drawing instruction from the storage unit and generates boldface form data of the character from the standard form data when the judgment unit judges that the character should be expressed in boldface type, and determines horizontal and vertical shift amounts, the shift amounts being determined so that result of repeating drawing of a dot of the standard form data by shifting the standard form data in the horizontal and vertical directions according to the shift amounts to draw a matrix lacks one or more dots at each of four corners of the matrix; and an output unit which converts the boldface form data generated by the boldface data-generating unit into image-formation data and outputs the image-formation data to an image-formation device which forms an image according to the image-formation data, wherein:

the drawing instruction comprises italic type information specifying that the character should be expressed in italic type, the judgment unit further judges whether or not the italic type information is comprised in the drawing instruction, the boldface data-generating unit comprises a pattern data storage unit which stores pattern data for italic type made of a plurality of dots extending from a prescribed reference dot in a matrix and generated bused on a prescribed lean angle of italic type, and when the judgment unit judges that the italic type information is comprised in the drawing instruction and the character should be expressed in boldface type, the boldface data-generating unit generates the boldface form data by deforming the standard form data read out from the storage unit based on the prescribed lean angle of italic type, generating drawing data for italic type which expresses the character in italic type by drawn dots to be drawn and undrawn dots not to be drawn based on the deformed standard form data, reading out the pattern data for italic type from the pattern data storage unit, and enlarging a drawing area of the drawing data for italic type based on the pattern data for italic type.

15. The image-processing device according to claim 14, wherein the boldface data-generating unit generates the boldface form data by enlarging the shrinking area of the drawing data, by successively placing the prescribed reference dot of the pattern data on each drawn dot of the drawing data and drawing all the dots inside a pattern area, formed each time by the dots of the pattern data, as drawn dots.

16. A computer readable medium comprising computer-readable instructions that cause a computer to:
    judge, upon receiving a drawing instruction comprising a character code specifying a character, font information specifying a font type, font size information specifying a font size, and style information specifying whether or not to express the character in boldface type, whether each character should be expressed in boldface type or not based on the style information comprised in the drawing instruction;
    generate boldface form data of the character if it is judged that the character should be expressed in boldface type, by reading out standard form data of the character corresponding to the font type specified by the font information comprised in the drawing instruction from a storage unit which stores font data of each character, the font data comprising a character code specifying the character and form data representing form of the character specified by the character code with standard form data for each of a plurality of prescribed fonts, determining shift amounts in horizontal and vertical directions based on the font size information comprised in the drawing instruction, each of the shift amounts specifying horizontal shift amounts and vertical shift amounts, and repeating drawing of the standard form data by shifting the standard form data in the horizontal and vertical directions according to the determined shift amounts; and
    convert the boldface form data into image-formation data so as to output the image-formation data to an image-formation device which forms an image according to the image-formation data,
    wherein when generating the boldface data, the shift amounts in the horizontal and vertical directions are adjusted so that result of the repetition of the drawing of a dot of the standard form data by shifting the dot of the standard form data in the horizontal and vertical directions according to the shift amounts to draw a matrix lacks one or more dots at each of four corners of the matrix, and the boldface form data is generated by repeating the drawing of the standard form data according to the adjusted shift amounts in the horizontal and vertical directions.

17. A computer readable medium comprising computer-readable instructions that cause a computer to:
    judge, upon receiving a drawing instruction comprising a character code specifying a character, font information specifying a font type, and style information specifying whether or not to express the character in boldface type, whether each character should be expressed in boldface type or not based on the style information comprised in the drawing;
    read out standard form data of the character corresponding to the font type specified by the font information comprised in the drawing instruction from a storage unit which stores font data of each character with standard form data in each of a plurality of prescribed fonts, the font data comprising a character code specifying the character and form data representing form of the character specified by the character code;
    generate boldface form data of the character from the standard form data when the judgment step judges that the character should be expressed in boldface type; and
    convert the boldface form data into image-formation data so as to output the image-formation data to an image-formation device which forms an image according to the image-formation data,
    wherein when generating the boldface data, the boldface form data is generated by generating drawing data which expresses the character by drawn dots to be drawn and undrawn dots not to be drawn based on the standard form data read out from the storage unit, reading out pattern data comprising a plurality of dots extending from a prescribed reference dot in a matrix which lacks at least one dot at each of four corners of the matrix from a pattern data storage unit, and enlarging a drawing area of the drawing data based on the pattern data.

18. A computer readable medium comprising computer-readable instructions that cause a computer to:
    judge, upon receiving drawing instruction comprising a character code specifying a character, font information specifying a font type, font size information specifying a font size, and style information specifying whether or not to express the character in boldface type, whether each character should be expressed in boldface type or not based on the style information comprised in the drawing instruction;
    generate boldface form data of the character if it is judged that the character should be expressed in boldface type, by reading out standard form data of the character corresponding to the font type specified by the font information comprised in the drawing instruction from a storage unit which stores font data of each character with standard form data in each of a plurality of prescribed fonts, the font data comprising a character code specifying the character and form data representing form of the character specified by the character code, determining shift amounts in horizontal and vertical directions based on the font size information comprised in the drawing instruction, each of the shift amounts specifying horizontal shift amounts and vertical shift amounts, the shift amounts being determined so that result of repeating drawing of a dot of the standard form data by shifting the standard form data in the horizontal and vertical directions according to the shift amounts to draw a matrix lacks one or more dots at each of four corners of the matrix, and repeating drawing of the standard form data by shifting the standard form data in the horizontal and vertical directions according to the determined shift amounts; and
    convert the boldface form data into image-formation data so as to output the image-formation data to an image-formation device which forms an image according to the image-formation data, wherein the drawing instruction comprises italic type information specifying that the character should be expressed in italic type, wherein whether or not the italic type information is comprised in the drawing instruction is further judged, wherein when generating the boldface data, the shift amounts in the horizontal and vertical directions are adjusted based on the font size information and the italic type information, and wherein if it is judged that the italic type information is comprised in the drawing instruction and the character should be expressed in boldface type, the boldface form data is generated by generating form data for italic type by deforming the standard form data based on a prescribed lean angle of italic type and repeating drawing of the form data for italic type according to the shift amounts.

19. A computer readable medium comprising computer-readable instructions that cause a computer to:

judge, upon receiving a drawing instruction comprising a character code specifying a character, font information specifying a font type, font size information specifying a font size, and style information specifying whether or not to express the character in boldface type, whether each character should be expressed in boldface type or not based on the style information comprised in the drawing instruction;

generate boldface form data of the character if it is judged that the character should be expressed in boldface type, by reading out standard form data of the character corresponding to the font type specified by the font information comprised in the drawing instruction from a storage unit which stores font data of each character with standard form data in each of a plurality of prescribed fonts, the font data comprising a character code specifying the character and form data representing form of the character specified by the character code, determining shift amounts in horizontal and vertical directions based on the font size information comprised in the drawing instruction, each of the shift amounts specifying horizontal shift amounts and vertical shift amounts, the shift amounts being determined so that result of repeating drawing of a dot of the standard form data by shifting the standard form data in the horizontal and vertical directions according to the shift amounts to draw a matrix lacks one or more dots at each of four corners of the matrix, and repeating drawing of the standard form data by shifting the standard form data in the horizontal and vertical directions according to the determined shift amounts; and convert the boldface form data into image-formation data so as to output the image-formation data to an image-formation device which forms an image according to the image-formation data, wherein the drawing instruction comprises rotation information specifying rotation of the character, wherein whether or not the rotation information is comprised in the drawing instruction is further judged, wherein when generating the boldface data, the shift amounts in the horizontal and vertical directions are adjusted based on the font size information and the rotation information, and wherein if it is judged that the rotation information is comprised in the drawing instruction and the character should be expressed in boldface type, the boldface form data is generated by generating form data for rotation by rotating the standard form data based on an angle specified by the rotation information and repeating drawing of the form data for rotation according to the shift amounts.

20. A computer readable medium comprising computer-readable instructions that cause a computer to:

judge, upon receiving a drawing instruction comprising a character code specifying a character, font information specifying a font type, and style information specifying whether or not to express the character in boldface type, whether each character should be expressed in boldface type or not based on the style information comprised in the drawing instruction;

read out standard form data of the character corresponding to the font type specified by the font information comprised in the drawing instruction from a storage unit which stores font data of each character with the form data comprising standard form data in each of a plurality of prescribed fonts, the font data comprising a character code specifying the character and form data representing form of the character specified by the character code, so as to generate boldface form data of the character from the standard form data if it is judged that the character should be expressed in boldface type, the boldface being generated by repeating drawing of a dot of the standard form by horizontal and vertical shift amounts, the shift amounts being determined so that result of repeating drawing of a dot of the standard form data by shifting the standard form data in the horizontal and vertical directions according to the shift amounts to draw a matrix lacks one or more dots at each of four corners of the matrix; and convert the boldface form data into image-formation data so as to output the image-formation data to an image-formation device which forms an image according to the image-formation data, wherein:

the drawing instruction comprises italic type information specifying that the character should be expressed in italic type, whether or not the italic type information is comprised in the drawing instruction is further judged, if it is judged that the italic type information is comprised in the drawing instruction and the character should be expressed in boldface type, the boldface form data is generated by deforming the standard form data read out from the storage unit based on a prescribed lean angle of italic type, generating drawing data for italic type which expresses the character in italic type by drawn dots to be drawn and undrawn dots not to be drawn based on the deformed standard form data, reading out pattern data for italic type comprising a plurality of dots extending from a prescribed reference dot in a matrix and generated based on the prescribed lean angle of italic type from a pattern data storage unit, and enlarging a drawing area of the drawing data for italic type based on the pattern data for italic type.

* * * * *